United States Patent
Song et al.

(10) Patent No.: US 9,984,814 B2
(45) Date of Patent: May 29, 2018

(54) WIRELESS POWER TRANSMITTER, WIRELESS POWER RELAY APPARATUS, AND WIRELESS POWER RECEIVER

(71) Applicant: Samsung Electronics Co., Ltd., Suwon-si (KR)

(72) Inventors: Keum Su Song, Seoul (KR); Sang Wook Kwon, Seongnam-si (KR); Ki Young Kim, Yongin-si (KR); Nam Yun Kim, Seoul (KR); Dong Zo Kim, Yongin-si (KR); Yun Kwon Park, Dongducheon-si (KR); Eun Seok Park, Yongin-si (KR); Chi Hyung Ahn, Suwon-si (KR); Young Ho Ryu, Yongin-si (KR); Chang Wook Yoon, Seoul (KR); Jin Sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 13/938,671

(22) Filed: Jul. 10, 2013

(65) Prior Publication Data
US 2014/0021796 A1    Jan. 23, 2014

(30) Foreign Application Priority Data

Jul. 10, 2012  (KR) .................. 10-2012-0074899

(51) Int. Cl.
| | | |
|---|---|---|
| *H01F 38/14* | (2006.01) | |
| *H02J 50/90* | (2016.01) | |
| *H02J 50/40* | (2016.01) | |
| *H02J 50/12* | (2016.01) | |
| *H02J 5/00* | (2016.01) | |
| *H02J 7/02* | (2016.01) | |

(Continued)

(52) U.S. Cl.
CPC .............. *H01F 38/14* (2013.01); *H02J 5/005* (2013.01); *H02J 7/025* (2013.01); *H02J 50/12* (2016.02); *H02J 50/40* (2016.02); *H02J 50/90* (2016.02); *H01F 2021/125* (2013.01); *H02J 2007/0096* (2013.01)

(58) Field of Classification Search
CPC ............ H01F 38/14; H02J 5/005; H02J 7/025
See application file for complete search history.

(56) References Cited

U.S. PATENT DOCUMENTS

| | | | |
|---|---|---|---|
| 8,482,158 B2 * | 7/2013 | Kurs ...................... | H01Q 1/248 307/104 |
| 2007/0024510 A1 * | 2/2007 | Ghabra .............. | G07C 9/00944 343/711 |

(Continued)

FOREIGN PATENT DOCUMENTS

| | | |
|---|---|---|
| JP | 2011-193619 A | 9/2011 |
| KR | 10-2010-0072264 A | 6/2010 |

(Continued)

*Primary Examiner* — Jared Fureman
*Assistant Examiner* — Joel Barnett
(74) *Attorney, Agent, or Firm* — NSIP Law

(57) ABSTRACT

A wireless power transmitter includes a source resonator configured to wirelessly transmit power via magnetic coupling with a target resonator; and an impedance adjusting unit configured to adjust an impedance of the source resonator using a plurality of impedance-matching bars located in the source resonator.

19 Claims, 21 Drawing Sheets

(51) Int. Cl.
*H01F 21/12* (2006.01)
*H02J 7/00* (2006.01)

(56) References Cited

U.S. PATENT DOCUMENTS

| | | | | |
|---|---|---|---|---|
| 2009/0058189 A1* | 3/2009 | Cook | .................... | H04B 5/0037 307/104 |
| 2010/0117454 A1* | 5/2010 | Cook | .................... | G06K 7/0008 307/104 |
| 2011/0127848 A1* | 6/2011 | Ryu | ........................ | H02J 5/005 307/104 |
| 2011/0237207 A1* | 9/2011 | Bauder | .................. | H01Q 1/521 455/78 |
| 2011/0248832 A1* | 10/2011 | El Waffaoui | ....... | G06K 19/0726 340/10.5 |
| 2012/0062039 A1* | 3/2012 | Kamata | ................... | H02J 5/005 307/104 |
| 2014/0104132 A1* | 4/2014 | Bakalski | ................. | H03H 7/38 343/861 |

FOREIGN PATENT DOCUMENTS

| | | |
|---|---|---|
| KR | 10-2011-0004321 A | 1/2011 |
| KR | 10-2011-0010104 A | 1/2011 |
| KR | 10-2011-0050697 A | 5/2011 |
| KR | 10-2011-0068621 A | 6/2011 |
| KR | 10-2011-0094739 A | 8/2011 |
| KR | 10-2011-0116854 A | 10/2011 |
| KR | 10-2011-0120068 A | 10/2011 |

* cited by examiner

→ INPUT CURRENT
---→ INDUCED CURRENT

WIRELESS POWER TRANSMITTER, WIRELESS POWER RELAY APPARATUS, AND WIRELESS POWER RECEIVER

CROSS-REFERENCE TO RELATED APPLICATIONS

This application claims the benefit under 35 USC 119(a) of Korean Patent Application No. 10-2012-0074899 filed on Jul. 10, 2012, in the Korean Intellectual Property Office, the entire disclosure of which is incorporated herein by reference.

BACKGROUND

1. Field

The following description relates to an apparatus for wirelessly receiving and transmitting power.

2. Description of Related Art

Research on wireless power transmission has been ongoing to alleviate increasingly common inconveniences caused by wired power supplies and the limited capacity of batteries resulting from an explosive increase in various mobile devices such as electric vehicles and mobile electronic devices. One wireless power transmission technology uses resonance characteristics of radio frequency (RF) devices. For example, a wireless power transmission system using resonance characteristics may include a source configured to supply power, and a target configured to receive supplied power.

SUMMARY

In one general aspect, a wireless power transmitter includes a source resonator configured to wirelessly transmit power via magnetic coupling with a target resonator; and an impedance adjusting unit configured to adjust an impedance of the source resonator using a plurality of impedance-matching bars located in the source resonator.

The impedance adjusting unit may include a switch configured to electrically connect together at least two impedance-matching bars among the plurality of impedance-matching bars.

The wireless power transmitter may further include a controller configured to transmit test power via the source resonator; calculate either one or both of a power transmission efficiency and a reflection coefficient based on power received via the target resonator; and determine a value of an impedance to be set by the impedance adjusting unit based on either one or both of the power transmission efficiency and the reflection coefficient.

The source resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and a capacitor connected in series between the first signal conducting portion and the second signal conducting portion with respect to a current flowing through the first signal conducting portion and the second signal conducting portion.

The impedance adjusting unit may include a third conductor electrically connected to the first ground conducting portion; a plurality of fourth conductors electrically connected to the third conductor; a plurality of fifth conductors electrically connectable to and disconnectable from the plurality of fourth conductors via a plurality of switches; and a sixth conductor electrically connected to the plurality of fifth conductors; and the plurality of fourth conductors and the plurality of fifth conductors are the plurality of impedance-matching bars.

The source resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically isolated from the first ground conducting portion and electrically connected to the second signal conducting portion; and a capacitor connected in series between the first signal conducting portion and the second signal conducting portion with respect to a current flowing through the first signal conducting portion and the second signal conducting portion; the impedance adjusting unit may include a plurality of third conductors electrically connected to the first conductor; a plurality of fourth conductors electrically connected to the second conductor; and a plurality of switches configured to electrically connect the plurality of third conductors to the plurality of fourth conductors; and the plurality of third conductors and the plurality of fourth conductors are the plurality of impedance-matching bars.

The source resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connected to the first signal conducting portion; a third conductor electrically isolated from the second conductor and electrically connected to the first ground conducting portion; and a capacitor connected in series between the first signal conducting portion and the second signal conducting portion with respect to a current flowing through the first signal conducting portion and the second signal conducting portion; the impedance adjusting unit may include a plurality of fourth conductors electrically connected to the first conductor; a plurality of fifth conductors electrically connected to the second conductor; a plurality of sixth conductors electrically connected to the third conductor; a plurality of first switches configured to electrically connect some of the plurality of fourth conductors to the plurality of fifth conductors; and a plurality of second switches configured to electrically connect remaining ones of the plurality of fourth conductors to the plurality of sixth conductors; and the plurality of fourth conductors, the plurality of fifth conductors, and the plurality of sixth conductors are the plurality of impedance-matching bars.

The source resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically isolated from the first ground conducting portion and electrically connected to the second signal conducting portion; and a capacitor connected in series between the first signal conducting portion and the second signal conducting portion with respect to a current flowing through the first signal conducting portion and the second signal conducting portion; the impedance adjusting unit may include a plurality of third conductors each having a shape of a linear bar; a fourth conductor electrically connected to the plurality of third conductors; a plurality of first switches configured to electrically connect the plurality of third conductors to the first conductor; and a plurality of second switches configured to electrically connect the plurality of third conductors to the second conductor; and the plurality of third conductors are the plurality of impedance-matching bars.

The impedance adjusting unit may be further configured to adjust the impedance of the source resonator by adjusting a size of a driving coil located in the source resonator using a plurality of switches.

The impedance adjusting unit may include a plurality of first conductors each having a semicircular shape; a plurality of second conductors each having a semicircular shape; a third conductor electrically connecting together a first end of each of the plurality of first conductors and a first end of each of the plurality of second conductors; and a plurality of switches configured to electrically connect a second end of each of the plurality of first conductors to a second end of a respective one of the plurality of second conductors; and the plurality of first conductors and the plurality of second conductors are the plurality of impedance-matching bars.

The impedance adjusting unit may be further configured to adjust the size of the driving coil using the plurality of switches to connect together at least two of the plurality of impedance-matching bars to form a driving coil having a desired size.

In another general aspect, a wireless power relay apparatus includes a relay resonator configured to perform either one or both of wireless power reception from at least one source resonator and wireless power transmission to at least one target resonator; and an impedance adjusting unit configured to adjust an impedance of the relay resonator using a plurality of impedance-matching bars located in the relay resonator.

The impedance adjusting unit may include at least one switch configured to electrically connect together at least two impedance-matching bars among the plurality of impedance-matching bars.

The relay resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and a capacitor connected in series between the first signal conducting portion and the second signal conducting portion with respect to a current flowing through the first signal conducting portion and the second signal conducting portion; the impedance adjusting unit may include a third conductor electrically connected to the first ground conducting portion; a plurality of fourth conductors electrically connected to the third conductor; a plurality of fifth conductors electrically connectable to or disconnectable from the plurality of fourth conductors via a plurality of switches; and a sixth conductor electrically connected to the plurality of fifth conductors; and the plurality of fourth conductors and the plurality of fifth conductors are the plurality of impedance-matching bars.

The relay resonator may be further configured to receive wireless power from a plurality of source resonators, and transmit the received wireless power to a plurality of target resonators.

In another general aspect, a wireless power receiver includes a target resonator configured to wirelessly receive power via magnetic coupling with a source resonator; and an impedance adjusting unit configured to adjust an impedance of the target resonator using a plurality of impedance-matching bars located in the target resonator.

The impedance adjusting unit may include at least one switch configured to electrically connect together at least two impedance-matching bars among the plurality of impedance-matching bars.

The wireless power receiver may further include a controller configured to receive information on an impedance calculated using test power from a wireless power transmitter; and determine a value of an impedance to be set by the impedance adjusting unit.

The target resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and a capacitor connected in series between the first signal conducting portion and the second signal conducting portion with respect to a current flowing through the first signal conducting portion and the second signal conducting portion; the impedance adjusting unit may include a third conductor electrically connected to the first ground conducting portion; a plurality of fourth conductors electrically connected to the third conductor; a plurality of fifth conductors electrically connectable to or disconnectable from the plurality of fourth conductors via a plurality of switches; and a sixth conductor electrically connected to the plurality of fifth conductors; and the plurality of fourth conductors and the plurality of fifth conductors are the plurality of impedance-matching bars.

The target resonator may include a first transmission line including a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically isolated from the first ground conducting portion and electrically connected to the second signal conducting portion; and a capacitor connected in series between the first signal conducting portion and the second signal conducting portion with respect to a current flowing through the first signal conducting portion and the second signal conducting portion; the impedance adjusting unit may include a plurality of third conductors electrically connected to the first conductor; a plurality of fourth conductors electrically connected to the second conductor; and a plurality of switches configured to electrically connect the plurality of third conductors to the plurality of fourth conductors; and the plurality of third conductors and the plurality of fourth conductors are the plurality of impedance-matching bars.

Other features and aspects will be apparent from the following detailed description, the drawings, and the claims.

DETAILED DESCRIPTION

Figure 1:
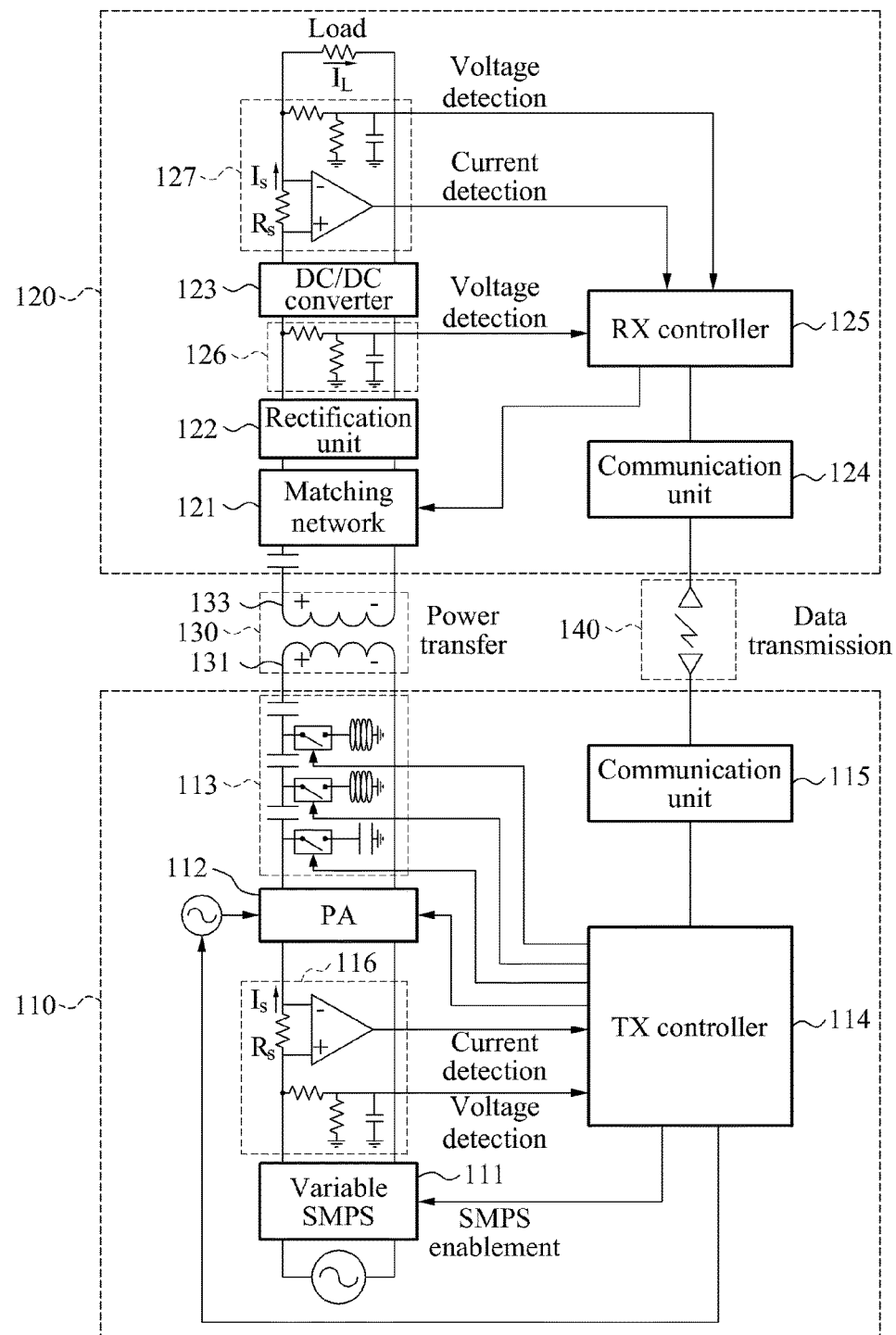
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

A scheme of performing communication between a source and a target may be an in-band communication scheme, or an out-band communication scheme, or a combination of both. The in-band communication scheme refers to communication performed between the source and the target in the same frequency band that is used for power transmission. The out-band communication scheme refers to communication performed between the source and the target in a frequency band that is different from a frequency band used for power transmission.

FIG. 1 is a diagram illustrating an example of a wireless power transmission system. Referring to FIG. 1, the wireless power transmission system includes a source 110 and a target 120. The source 110 is a device configured to supply wireless power, and may be any electronic device capable of supplying power, such as, for example, a pad, a terminal, a television (TV), a medical device, and an electric vehicle. The target 120 is a device configured to receive wireless power, and may be any electronic devices requiring power, such as, for example, a washing machine, a radio, an electric light, a TV, a pad, a terminal, a tablet personal computer (PC), a medical device, and an electric vehicle.

The source 110 includes a variable switching mode power supply (SMPS) 111, a power amplifier (PA) 112, a matching network 113, a transmission (TX) controller 114, such as, for example, TX control logic, a communication unit 115, and a power detector 116.

The variable SMPS 111 generates a direct current (DC) voltage from an alternating current (AC) voltage having a frequency of tens of hertz (Hz) output from a power supply. The variable SMPS 111 may output a DC voltage having a predetermined level, or may output a DC voltage having an adjustable level under the control of the TX controller 114.

The variable SMPS 111 may control a voltage supplied to the PA 112 based on a level of power output from the PA 112 so that the PA 112 may operate in a saturation region with a high efficiency at all times, thereby enabling a maximum efficiency to be maintained at all levels of the output power. The PA 112 may have class-E features.

If a fixed SMPS outputting a fixed output voltage is used instead of the variable SMPS 111, a variable DC-to-DC (DC/DC) converter needs to be used to convert the fixed voltage output from the SMPS to a variable voltage supplied to the PA 112. In this example, the common SMPS and the variable DC/DC converter may control a voltage supplied to the PA 112 based on the level of the power output from the PA 112 so that the PA 112 may operate in the saturation region with high efficiency at all times, thereby enabling the maximum efficiency to be maintained at all levels of the output power.

The power detector 116 detects an output current and an output voltage of the variable SMPS 111, and provides, to the TX controller 114, information on the detected current and the detected voltage. Also, the power detector 116 detects an input current and an input voltage of the power amplifier 112.

The power amplifier 112 generates power by converting a DC voltage having a predetermined level to an AC voltage using a switching pulse signal in a band of a few kilohertz (kHz) to tens of MHz. Accordingly, the power amplifier 112 converts a DC voltage supplied to the power amplifier 112 to an AC voltage having a reference resonant frequency $F_{Ref}$, and generates communication power used for communication, or charging power used for charging, or both. The communication power and the charging power may be used in a plurality of target devices.

The communication power may be a low power of 0.1 milliwatt (mW) to 1 mW. The charging power may be a high power of 1 mW to 200 W that is consumed by a device load of a target device. In various examples described herein, the term "charging" may refer to supplying power to a unit or element that is configured to charge a battery or other rechargeable device with power. Additionally, the term "charging" may refer to supplying power to a unit or element that is configured to consume power. The units or elements may include, for example, batteries, displays, sound output circuits, main processors, and various sensors.

The term "reference resonant frequency" refers to a resonant frequency that is nominally used by the source 110, and the term "tracking frequency" refers to a resonant frequency that is actually used by the source 110 and has been adjusted based on a preset scheme.

The TX controller 114 detects a reflected wave of the communication power or the charging power, and detects mismatching that occurs between a target resonator 133 and a source resonator 131 based on the detected reflected wave. To detect the mismatching, for example, the TX controller 114 may detect an envelope of the reflected wave, a power amount of the reflected wave, or any other parameter of the reflected wave that is affected by the mismatching.

The matching network 113 compensates for impedance mismatching between the source resonator 131 and the target resonator 133 to achieve optimal matching under the control of the TX controller 114. The matching network 113 includes a plurality of switches each connected to a capacitor or an inductor, and the switches are controlled by the TX controller 114 to achieve optimal matching.

The TX controller 114 calculates a voltage standing wave ratio (VSWR) based on a voltage level of the reflected wave and a level of an output voltage of the source resonator 131 or the power amplifier 112. For example, when the VSWR is greater than a predetermined value, the TX controller 114 detects that there is mismatching between the source resonator 131 and the target resonator 133.

If the TX controller 114 detects that the VSWR is greater than the predetermined value, the TX controller 114 may compute a power transmission efficiency for each of N tracking frequencies, determine a tracking frequency $F_{Best}$ providing the best power transmission efficiency among the N tracking frequencies, and change the reference resonant frequency $F_{Ref}$ to the tracking frequency $F_{Best}$. The N tracking frequencies may be set in advance.

The TX controller 114 may adjust a frequency of the switching pulse signal used by the power amplifier 112. For example, by controlling the frequency of the switching pulse signal used by the power amplifier 112, the TX controller 114 may generate a modulation signal to be transmitted to the target 120. In other words, the TX controller 114 may transmit a variety of data (not illustrated in FIG. 1) to the target 120 using in-band communication. The TX controller 114 may also detect a reflected wave, and may demodulate a signal received from the target 120 based on an envelope of the detected reflected wave.

The TX controller 114 may generate a modulation signal for in-band communication using various techniques. For example, the TX controller 114 may generate the modulation signal by turning on or off a switching pulse signal, by performing delta-sigma modulation, or using any other modulation technique known to one of ordinary skill in the art. Additionally, the TX controller 114 may generate a pulse-width modulation (PWM) signal having a predetermined envelope.

The TX controller 114 may determine an initial wireless power that is to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to detect a change in a temperature of the source 110. The source 110 may receive, from the target 120, information regarding the battery state of the target 120, the change in the amount of power received by the target 120, and/or the change in the temperature of the target 120 by communicating with the target 120. The change in the temperature of the target 120 may be detected based on data received from the target 120.

The TX controller 114 may adjust a voltage supplied to the PA 112 using a lookup table. The lookup table may be used to store an amount of the voltage to be adjusted based on the change in the temperature of the source 110. For example, when the temperature of the source 110 rises, the TX controller 114 may reduce the voltage supplied to the PA 112.

The communication unit 115 may perform out-band communication that employs a communication channel. The communication unit 115 may include a communication module, such as a ZigBee module, a Bluetooth module, or any other communication module known to one of ordinary skill in the art. The communication unit 115 may transmit data 140 to the target 120 through the out-band communication.

The source resonator 131 transfers electromagnetic energy 130 to the target resonator 133. For example, the source resonator 131 transfers the communication power or the charging power to the target 120 via magnetic coupling with the target resonator 133.

As illustrated in FIG. 1, the target 120 includes a matching network 121, a rectification unit 122, a DC/DC converter 123, a communication unit 124, a reception (RX) controller 125, such as, for example, RX control logic, a voltage detector 126, and a power detector 127.

The target resonator 133 receives the electromagnetic energy 130 from the source resonator 131. For example, the target resonator 133 receives the communication power or the charging power from the source 110 via the magnetic coupling with the source resonator 131. Additionally, the target resonator 133 may receive data from the source 110 using the in-band communication (not illustrated in FIG. 1).

The target resonator 133 may receive the initial wireless power that is determined based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load. The matching network 121 may be configured with a combination of a capacitor and an inductor.

The rectification unit 122 generates a DC voltage by rectifying an AC voltage received from the target resonator 133.

The DC/DC converter 123 adjusts a level of the DC voltage that is output from the rectification unit 122 based on a voltage required by the load. As an example, the DC/DC converter 123 may adjust the level of the DC voltage output from the rectification unit 122 within a range of 3 volts (V) to 10 V.

The voltage detector 126 detects a voltage of an input terminal of the DC/DC converter 123, and the power detector 127 detects a current and an voltage of an output terminal of the DC/DC converter 123. The detected voltage of the input terminal may be used by the controller 125 to compute a transmission efficiency of power received from the source 110. The detected current and the detected voltage of the output terminal may be used by the RX controller 125 to compute an amount of power transferred to the load. The TX controller 114 of the source 110 may determine an amount of power that needs to be transmitted by the source 110 based on a power required by the load and a power transferred to the load.

When the amount of power transferred to the load computed by the communication unit 124 is transmitted to the source 110, the source 110 may compute an amount of power that needs to be transmitted to the target 120.

The communication unit 124 performs in-band communication to transmit or receive data using a resonant frequency. During the in-band communication, the RX controller 125 demodulates a received signal by detecting a signal between the target resonator 133 and the rectification unit 122, or detecting an output signal of the rectification unit 122. In other words, the RX controller 125 may demodulate a message received using the in-band communication.

Additionally, the RX controller 125 adjusts an impedance of the target resonator 133 using the matching network 121 to modulate a signal to be transmitted to the source 110. For example, the RX controller 125 may increase the impedance of the target resonator 133 so that a reflected wave may be detected by the TX controller 114 of the source 110. Depending on whether the reflected wave is detected, the TX controller 114 may detect a first value, for example, a binary number "0," or a second value, for example, a binary number "1." For example, when the reflected wave is detected, the TX controller may detect "0", and when the reflected wave is not detected, the TX controller may detect "1". Alternatively, when the reflected wave is detected, the TX controller may detect "1", and when the reflected wave is not detected, the TX controller may detect "0".

The communication unit 124 of the target 120 may transmit a response message to the communication unit 115 of the source 110. For example, the response message may include a type of a corresponding target, information about a manufacturer of a corresponding target, a model name of a corresponding target, a battery type of a corresponding target, a charging scheme of a corresponding target, an impedance value of a load of a corresponding target, information on characteristics of a target resonator of a corresponding target, information on a frequency band used by a corresponding target, an amount of power consumed by a corresponding target, an identifier (ID) of a corresponding target, information on a version or a standard of a corresponding target, and any other information about a corresponding target.

The communication unit 124 may perform out-band communication using a separate communication channel. For example, the communication unit 124 may include a communication module, such as a ZigBee module, a Bluetooth module, or any other communication module known to one of ordinary skill in the art. The communication unit 124 may transmit or receive the data 140 to or from the source 110 using the out-band communication.

The communication unit 124 may receive a wake-up request message from the source 110, and the power detector 127 may detect an amount of power received by the target resonator 133. The communication unit 124 may transmit, to the source 110, information on the detected amount of the power. The information on the detected amount of the power may include, for example, an input voltage value and an input current value of the rectification unit 122, an output voltage value and an output current value of the rectification unit 122, an output voltage value and an output current value of the DC/DC converter 123, and any other information about the detected amount of the power.

Figure 2:
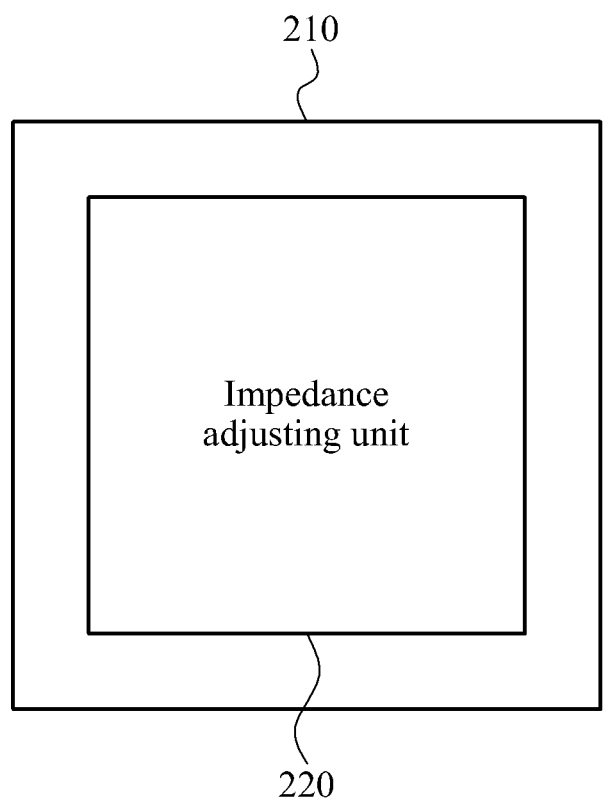
FIG. 2 is a diagram illustrating an example of a resonator.

FIG. 2 is a diagram illustrating an example of a resonator. The resonator may be used in a wireless power transmitter, a wireless power relay apparatus, and a wireless power receiver.

In one example, the wireless power transmitter includes a resonator 210 and an impedance adjusting unit 220. In another example, the wireless power relay apparatus includes a resonator 210 and an impedance adjusting unit 220. In another example, the wireless power receiver includes a resonator 210 and an impedance adjusting unit 220. In these examples, the impedance adjusting unit 220 may be located in the resonator 210 as illustrated in FIG. 2.

In the wireless power transmitter, the resonator 210 functions as a source resonator, and wirelessly transmits power via magnetic coupling with a target resonator.

In the wireless power relay apparatus, the resonator 210 wirelessly receives power from a source resonator and/or wirelessly transmits power to a target resonator.

In the wireless power receiver, the resonator 210 functions as a target resonator, and wirelessly receives power via magnetic coupling with a source resonator.

The impedance adjusting unit 220 adjusts an impedance of the resonator 210 using a plurality of impedance-matching bars located in the resonator 210 (not illustrated in FIG. 2, but illustrated in FIGS. 3-6). The impedance adjusting unit 220 includes at least one switch configured to electrically connect together at least two impedance-matching bars among the plurality of impedance-matching bars as will be described in detail later with respect to FIGS. 3-6. Additionally, the impedance adjusting unit 220 may adjust the impedance of the resonator 210 based on a size of a driving coil that is adjusted by a plurality of switches as will be described later with respect to FIGS. 7 and 8.

The wireless power transmitter includes a controller (not illustrated). In one example, the controller transmits a test power to a wireless power receiver via the resonator 210, calculates a power transmission efficiency and/or a reflection coefficient based on power received from the wireless power receiver in response to the test power, and determines a value of an impedance to be set by the impedance adjusting unit 220 based on the power transmission efficiency and/or the reflection coefficient.

The wireless power receiver includes a controller (not illustrated). In one example, the controller receives information on an impedance calculated using a test power received from a wireless power transmitter, and determines a value of an impedance to be set by the impedance adjusting unit 220 based on the information on the impedance calculated using the test power.

Operations of the controller in the wireless power transmitter and the controller in the wireless power receiver will be described in greater detail below with reference to FIG. 9.

A configuration of the resonator 210 and a configuration of the impedance adjusting unit 220 will be described in greater detail below with reference to FIGS. 3 through 6.

Figure 3:
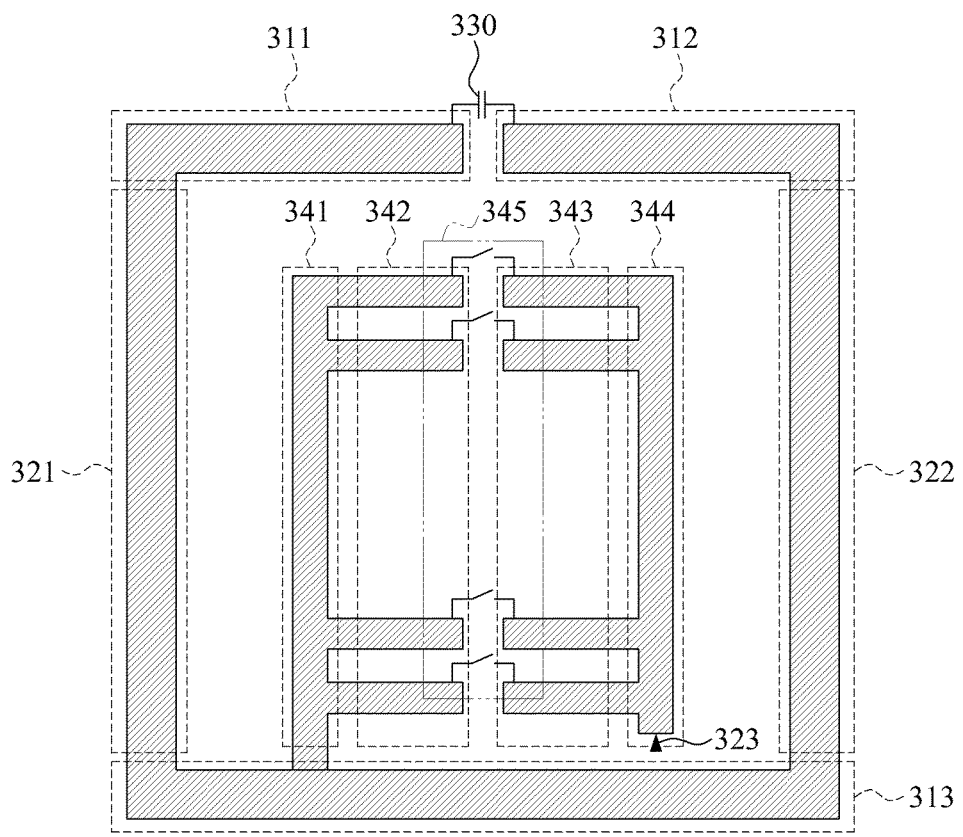
FIGS. 3 through 6 are diagrams illustrating examples of a structure of a resonator.

FIG. 3 is a diagram illustrating an example of a structure of a resonator. Referring to FIG. 3, the resonator includes a first signal conducting portion 311, a second signal conducting portion 312, a first ground conducting portion 313, a first conductor 321, a second conductor 322, and a capacitor 330. Although one capacitor 330 is shown in FIG. 3, the capacitor 330 may be implemented as a plurality of capacitors. The resonator 210 of FIG. 2 may be configured as the resonator of FIG. 3.

The first signal conducting portion 311, the second signal conducting portion 312, and the first ground conducting portion 313 form a first transmission line. The first ground conducting portion 313 faces the first signal conducting portion 311 and the second signal conducting portion 312. For example, the first ground conducting portion 313 may have the same shape as the first signal conducting portion 311, and may be located symmetrically to the first signal conducting portion 311. Additionally, the first ground conducting portion 313 may have the same shape as the first signal conducting portion 311 and the second signal conducting portion 312, and may be located symmetrically to the first signal conducting portion 311 and the second signal conducting portion 312.

The first conductor 321 electrically connects the first signal conducting portion 311 to the first ground conducting portion 313. The second conductor 322 electrically connects the second signal conducting portion 312 to the first ground conducting portion 313.

The capacitor 330 is connected in series between the first signal conducting portion 311 and the second signal conducting portion 312 with respect to a current flowing through the first signal conducting portion 311 and the second signal conducting portion 312.

In FIG. 3, an impedance adjusting unit includes a third conductor 341, fourth conductors 342, fifth conductors 343, a sixth conductor 344, and switches 345. The fourth conductors 342 and the fifth conductors 343 function as impedance-matching bars having a linear bar shape. The impedance adjusting unit 220 of FIG. 2 may be configured as the impedance adjusting unit of FIG. 3.

The third conductor 341 is electrically connected to the first ground conducting portion 313. For example, if the third conductor 341 has a shape of a bar, one end of the third conductor 341 may be electrically connected to the first ground conducting portion 313.

The fourth conductors 342 are electrically connected to the third conductor 341. Each of the fourth conductors 342 may be smaller in size than the third conductor 341.

The fifth conductors 343 and the fourth conductors 342 may be electrically connected to and disconnected from each other by turning the switches 345 on and off. Each of the fifth conductors 343 is located symmetrically to a respective one of the fourth conductors 342 with respect to a respective one of the switches 345.

The sixth conductor 344 is electrically connected to the fifth conductors 343. The sixth conductor 344 may be larger in size than each of the fifth conductors 343.

Feeding may be performed at one end of the sixth conductor 344 as indicated by 323. In one example in which power is wirelessly transmitted, feeding may refer to supplying power by supplying an AC voltage to a resonator. In another example in which power is wirelessly received, feeding may refer to supplying AC power received via a resonator to a rectifier.

Electrical connections between the fourth conductors 342 and the fifth conductors 343 may be controlled by turning respective ones of the switches 345 on and off, thereby adjusting a value of an impedance of the resonator. For example, the value of the impedance of the resonator may be adjusted based on a number of the switches 345 that are turned on or off. In this example, a controller (not illustrated) may determine which one of the switches 345 is to be turned on or off, or may determine a number of the switches 345 to be turned on or off.

Figure 4:
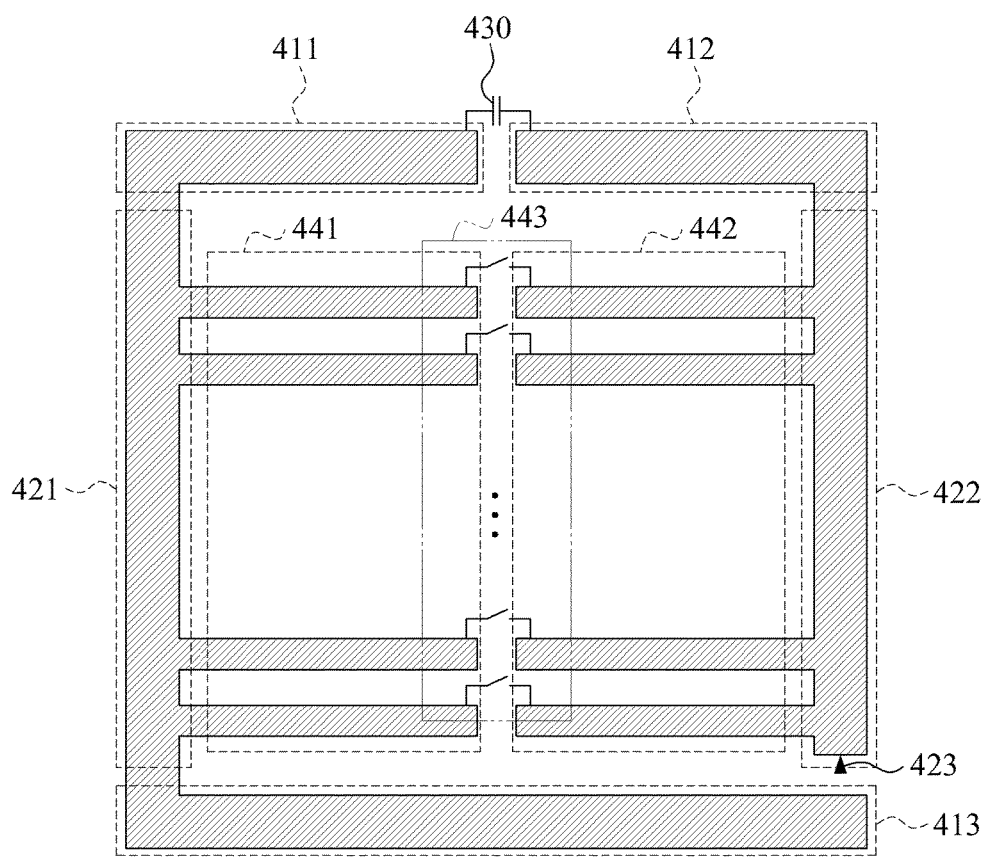

FIG. 4 is a diagram illustrating another example of a structure of a resonator. Referring to FIG. 4, a resonator includes a first signal conducting portion 411, a second signal conducting portion 412, a first ground conducting portion 413, a first conductor 421, a second conductor 422, and a capacitor 430. Although one capacitor 430 is shown in FIG. 4, the capacitor 430 may be implemented as a plurality of capacitors. The resonator 210 of FIG. 2 may be configured as the resonator of FIG. 4.

The first signal conducting portion 411, the second signal conducting portion 412, and the first ground conducting portion 413 form a first transmission line. The first ground conducting portion 413 faces the first signal conducting portion 411 and the second signal conducting portion 412. For example, the first ground conducting portion 413 may have the same shape as the first signal conducting portion 411, and may be located symmetrically to the first signal conducting portion 411. Additionally, the first ground conducting portion 413 may have the same shape as the first signal conducting portion 411 and the second signal conducting portion 412, and may be located symmetrically to the first signal conducting portion 411 and the second signal conducting portion 412.

The first conductor 421 electrically connects the first signal conducting portion 411 to the first ground conducting portion 413. The second conductor 422 is isolated from the first ground conducting portion 413, and is electrically connected to the second signal conducting portion 412. The second conductor 422 and the first ground conducting portion 413 may be spaced far enough apart from each other so that they do not electromagnetically affect each other.

The capacitor 430 is connected in series between the first signal conducting portion 411 and the second signal conducting portion 412 with respect to a current flowing through the first signal conducting portion 411 and the second signal conducting portion 412.

In FIG. 4, an impedance adjusting unit includes third conductors 441, fourth conductors 442, and switches 443. The third conductors 441 and the fourth conductors 442 function as impedance-matching bars having a linear bar shape. The impedance adjusting unit 220 of FIG. 2 may be configured as the impedance adjusting unit of FIG. 4.

The third conductors 441 are electrically connected to the first conductor 421. For example, when each of the third conductors 441 has a shape of a bar, one end of each of the third conductors 441 may be electrically connected to the first conductor 421.

The fourth conductors 442 are electrically connected to the second conductor 422. For example, when each of the fourth conductors 442 has a shape of a bar, one end of each of the fourth conductors 442 may be electrically connected to the second conductor 422.

The third conductors 441 and the fourth conductors 442 may be electrically connected to and disconnected from each other by turning respective ones of the switches 443 on and off. Each of the third conductors 441 is located symmetrically to a respective one of the fourth conductors 442 with respect to a respective one of the switches 443.

Feeding may be performed at one end of the second conductor 422 as indicated by 423. In one example in which power is wirelessly transmitted, feeding may refer to supplying power by supplying an AC voltage to a resonator. In another example in which power is wirelessly received, feeding may refer to supplying AC power received via a resonator to a rectifier.

Electrical connections between the third conductors 441 and the fourth conductors 442 may be controlled by turning the switches 443 on and off, thereby adjusting a value of an impedance of the resonator. For example, the value of the impedance of the resonator may be adjusted based on a number of the switches 443 that are turned on or off. In this example, a controller (not illustrated) may determine which one of the switches 443 is to be turned on or off, or determine a number of the switches 443 to be turned on or off.

Figure 5:
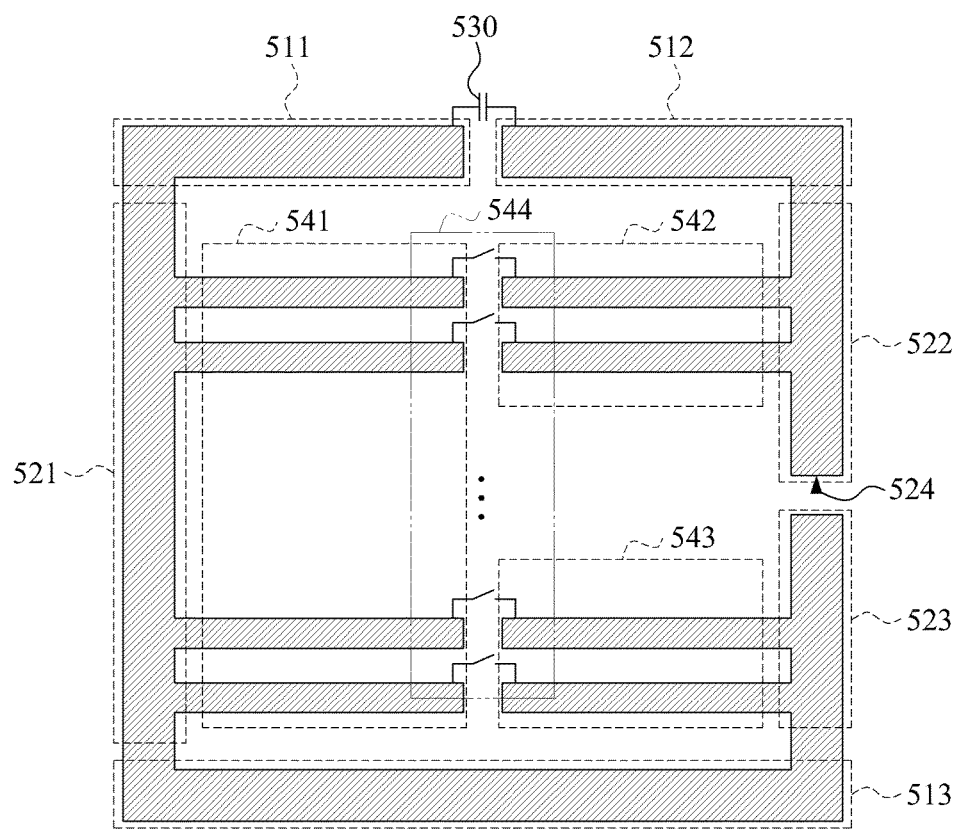

FIG. 5 is a diagram illustrating another example of a structure of a resonator. Referring to FIG. 5, a resonator includes a first signal conducting portion 511, a second signal conducting portion 512, a first ground conducting portion 513, a first conductor 521, a second conductor 522, a third conductor 523, and a capacitor 530. Although one capacitor 530 is shown in FIG. 5, the capacitor 530 may be implemented as a plurality of capacitors. The resonator 210 of FIG. 2 may be configured as the resonator of FIG. 5.

The first signal conducting portion 511, the second signal conducting portion 512, and the first ground conducting portion 513 form a first transmission line. The first ground conducting portion 513 faces the first signal conducting portion 511 and the second signal conducting portion 512. For example, the first ground conducting portion 513 may have the same shape as the first signal conducting portion 511, and may be located symmetrically to the first signal conducting portion 511. Additionally, the first ground conducting portion 513 may have the same shape as the first signal conducting portion 511 and the second signal conducting portion 512, and may be located symmetrically to the first signal conducting portion 511 and the second signal conducting portion 512.

The first conductor 521 electrically connects the first signal conducting portion 511 to the first ground conducting portion 513. The second conductor 522 is isolated from the third conductor 523, and is electrically connected to the second signal conducting portion 512. The second conductor 522 and the third conductor 523 may be spaced far enough apart from each other so that they do not electromagnetically affect each other. The third conductor 523 is isolated from the second conductor 522, and is electrically connected to the first ground conducting portion 513.

The capacitor 530 is connected in series between the first signal conducting portion 511 and the second signal conducting portion 512 with respect to a current flowing through the first signal conducting portion 511 and the second signal conducting portion 512.

In FIG. 5, an impedance adjusting unit includes fourth conductors 541, fifth conductors 542, sixth conductors 543, and switches 544. The fourth conductors 541, the fifth conductors 542, and the sixth conductors 543 function as impedance-matching bars having a linear bar shape. The impedance adjusting unit 220 of FIG. 2 may be configured as the impedance adjusting unit of FIG. 5.

The fourth conductors 541 are electrically connected to the first conductor 521. For example, when each of the fourth conductors 541 has a shape of a bar, one end of each of the fourth conductors 541 may be electrically connected to the first conductor 521.

The fifth conductors 542 are electrically connected to the second conductor 522. For example, when each of the fifth conductors 542 has a shape of a bar, one end of each of the fifth conductors 542 may be electrically connected to the second conductor 522.

The sixth conductors 543 are electrically connected to the third conductor 523. For example, when each of the sixth conductors 543 has a shape of a bar, one end of each of the sixth conductors 543 may be electrically connected to the third conductor 523.

The fourth conductors 541 and the fifth conductors 542 may be electrically connected to and disconnected from each other by turning respective ones of the switches 544 on and off. Each of the fifth conductors 542 is located symmetrically to a respective one of the fourth conductors 541 with respect to a respective one of the switches 544.

The fourth conductors 541 and the sixth conductors 543 may be electrically connected to and disconnected from each other by turning respective ones of the switches 544 on and off. Each of the sixth conductors 543 is located symmetrically to a respective one of the fourth conductors 541 with respect to a respective one of the switches 544.

Feeding may be performed at one end of the second conductor 522 as indicated by 524. In one example in which power is wirelessly transmitted, feeding may refer to supplying power by supplying an AC voltage to a resonator. In another example in which power is wirelessly received, feeding 524 refer to supplying AC power received via a resonator to a rectifier.

Electrical connections between the fourth conductors 541 and the fifth conductors 542, and electrical connections between the fourth conductors 541 and the sixth conductors 543, may be controlled by turning the switches 544 on or off, thereby adjusting a value of an impedance of the resonator. For example, the value of the impedance of the resonator may be adjusted based on a number of the switches 544 that are turned on or off. In this example, a controller (not illustrated) may determine which one of the switches 544 is to be turned on or off, or determine a number of the switches 544 to be turned on or off.

Figure 6:
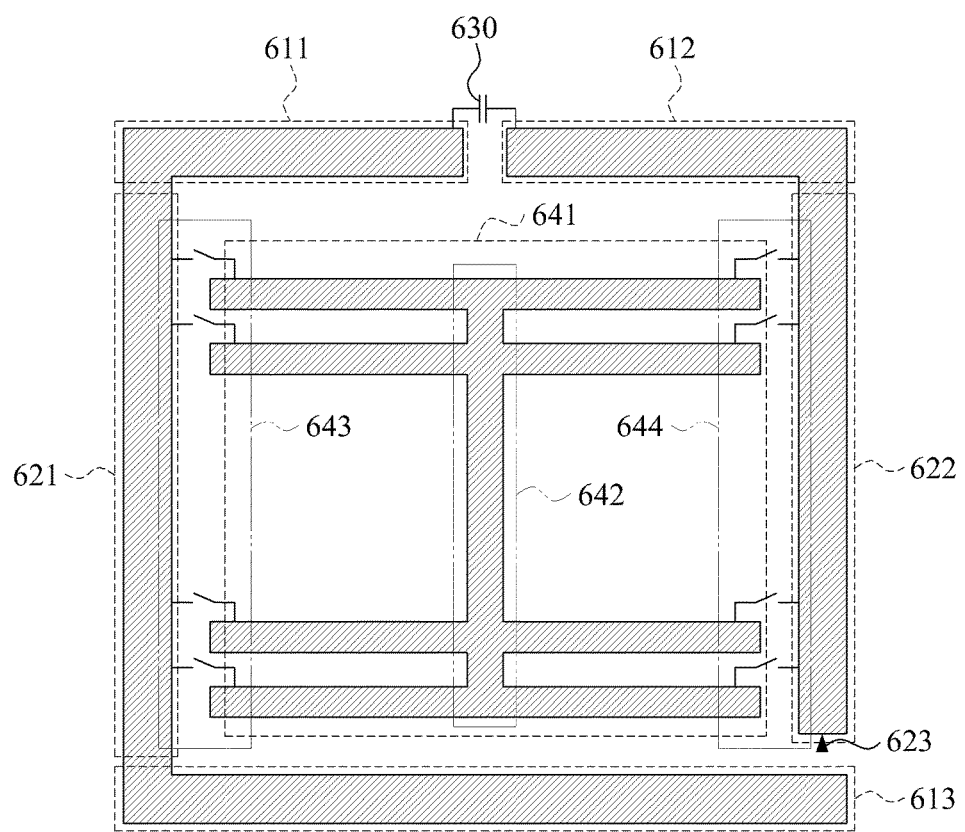

FIG. 6 is a diagram illustrating another example of a structure of a resonator. Referring to FIG. 6, a resonator includes a first signal conducting portion 611, a second signal conducting portion 612, a first ground conducting portion 613, a first conductor 621, a second conductor 622, and a capacitor 630. Although one capacitor 630 is shown in FIG. 6, the capacitor 630 may be implemented as a plurality of capacitors. The resonator 210 of FIG. 2 may be configured as the resonator of FIG. 6.

The first signal conducting portion 611, the second signal conducting portion 612, and the first ground conducting portion 613 form a first transmission line. The first ground conducting portion 613 faces the first signal conducting portion 611 and the second signal conducting portion 612. For example, the first ground conducting portion 613 may have the same shape as the first signal conducting portion 611, and may be located symmetrically to the first signal conducting portion 611. Additionally, the first ground conducting portion 613 may have the same shape as the first signal conducting portion 611 and the second signal conducting portion 612, and may be located symmetrically to the first signal conducting portion 611 and the second signal conducting portion 612.

The first conductor 621 electrically connects the first signal conducting portion 611 to the first ground conducting portion 613. The second conductor 622 is isolated from the first ground conducting portion 613, and is electrically connected to the second signal conducting portion 612. The second conductor 622 and the first ground conducting portion 613 may be spaced far enough apart from each other so that they do not electromagnetically affect each other.

The capacitor 630 is connected in series between the first signal conducting portion 611 and the second signal conducting portion 612 with respect to a current flowing through the first signal conducting portion 611 and the second signal conducting portion 612.

In FIG. 6, an impedance adjusting unit includes third conductors 641, a fourth conductor 642, and switches 643 and 644. The third conductors 641 function as impedance-matching bars having a linear bar shape. The impedance adjusting unit 220 of FIG. 2 may be configured as the impedance adjusting unit of FIG. 6.

Each of the third conductors 641 has a shape of a linear bar, and is electrically connected to the first conductor 621 via a respective one of the switches 643, and electrically connected to the second conductor 622 via a respective one of the switches 644. The fourth conductor 642 electrically connects the third conductors 641 to each other.

The third conductors 641 and the first conductor 621 may be electrically connected to and disconnected from each other by turning the switches 643 on and off.

The third conductors 641 and the second conductor 622 may be electrically connected to and disconnected from each other by turning the switches 644 on and off.

Feeding may be performed at one end of the second conductor 622 as indicated by 323. In one example in which power is wirelessly transmitted, the feeding 623 may refer to supplying power by supplying an AC voltage to a resonator. In another example in which power is wirelessly received, feeding may refer to supplying AC power received via a resonator to a rectifier.

Electrical connections between the third conductors 641 and the first conductor 621 may be controlled by turning the switches 643 on or off, thereby adjusting a value of an impedance of the resonator. For example, the value of the impedance of the resonator may be adjusted based on a number of the switches 643 that are turned on or off. In this example, a controller (not illustrated) may determine which one of the switches 643 is to be turned on or off, or may determine a number of the switches 643 to be turned on or off.

Additionally, electrical connections between the third conductors 641 and the second conductor 622 may be controlled by turning the switches 644 on or off, thereby adjusting a value of an impedance of the resonator. For example, the value of the impedance of the resonator may be adjusted based on a number of the switches 644 that are turned on or off. In this example, a controller (not illustrated) may determine which one of the switches 644 is to be turned on or off, or determine a number of the switches 644 to be turned on or off.

Figure 7:
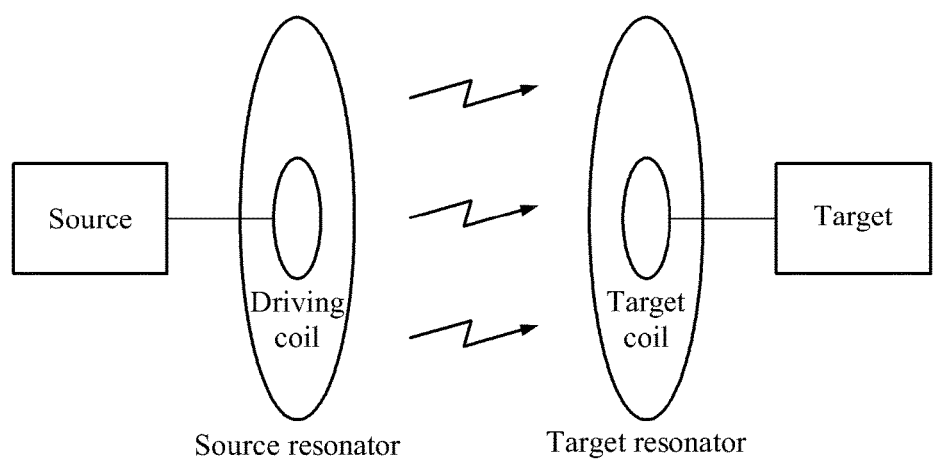
FIG. 7 is a diagram illustrating an example of a wireless power transmission system in which impedance matching is performed by adjusting a size of a driving coil and a size of a target coil.

FIG. 7 is a diagram illustrating an example of a wireless power transmission system in which impedance matching is performed by adjusting a size of a driving coil and a size of a target coil. Referring to FIG. 7, a source may adjust a size of a driving coil located in a source resonator, thereby adjusting an impedance of the source resonator. A target may adjust a size of a target coil located in a target resonator, thereby adjusting an impedance of the target resonator.

For example, power supplied from the source to the driving coil may be transferred to the source resonator via mutual resonance between the driving coil and the source resonator, and may then be transferred from the source resonator to the target resonator via mutual resonance between the source resonator and the target resonator. Subsequently, the power transferred to the target resonator via mutual resonance between the source resonator and the target resonator may be transferred to the target coil via mutual resonance between the target resonator and the target coil. The power transferred to the target coil may then be transferred to the target.

In an example in which an output impedance of the source is matched to an input impedance of the target, power may be efficiently transmitted from the source resonator to the target resonator. In this example, the source may adjust the impedance of the source resonator by adjusting the size of the driving coil so that the output impedance of the source is matched to the input impedance of the target.

In the example in which an output impedance of the source is matched to an input impedance of the target, the target resonator may efficiently receive power from the source resonator. In this example, the target may adjust the impedance of the target resonator by adjusting the size of the target coil so that the output impedance of the source is matched to the input impedance of the target.

Figure 8:
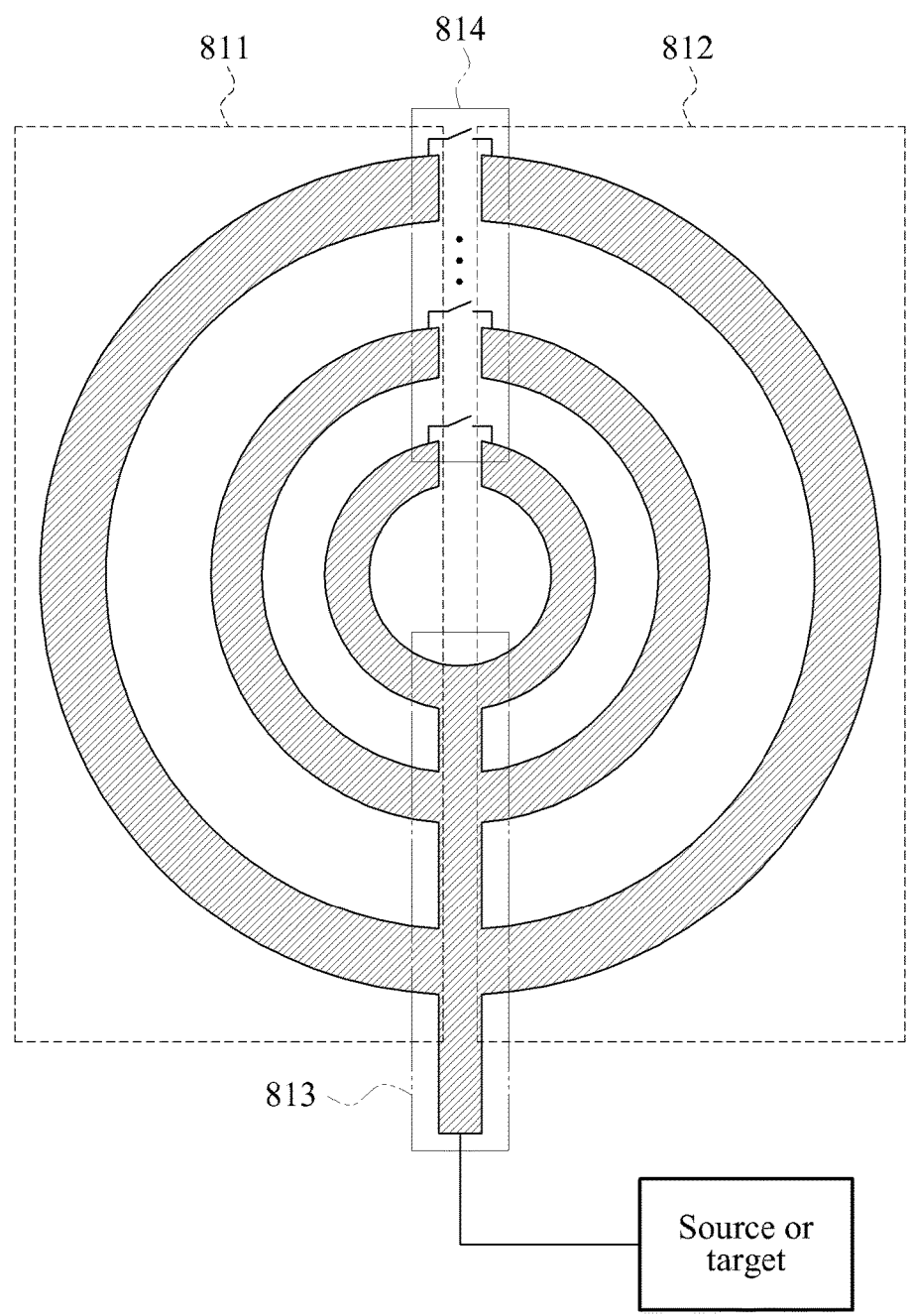
FIG. 8 is a diagram illustrating an example of a driving coil or a target coil that has an adjustable size.

FIG. 8 is a diagram illustrating an example of a driving coil or a target coil that has an adjustable size. A structure of FIG. 8 may be applied to the driving coil or the target coil of FIG. 7. Referring to FIG. 8, the driving coil or the target coil includes first conductors 811, second conductors 812, a third conductor 813, and switches 814.

The first conductors 811 each have a semicircular shape, and have different sizes. Additionally, the second conductors 812 each have a semicircular shape, and have different sizes. The first conductors 811 and the second conductors 812 function as impedance-matching bars having a semicircular bar shape. The third conductor 813 electrically connects the first conductors 811 to the second conductors 812. For example, the third conductor 813 electrically connects one end of each of the first conductors 811 to one end of a respective one of the second conductors to form the driving coil or the target coil in the form of a horseshoe.

The first conductors 811 and the second conductors 812 may be connected to and disconnected from each other by turning the switches 814 on and off.

Electrical connections between the first conductors 811 and the second conductors 812 may be controlled by turning the switches 814 on or off, thereby adjusting a value of an impedance of the resonator. For example, the value of the impedance of the resonator may be adjusted based on a number of the switches 814 that are turned on or off. In this example, a source or a target may determine which one of the switches 814 is to be turned on or off, or may determine a number of the switches 814 to be turned on or off.

Figure 9:
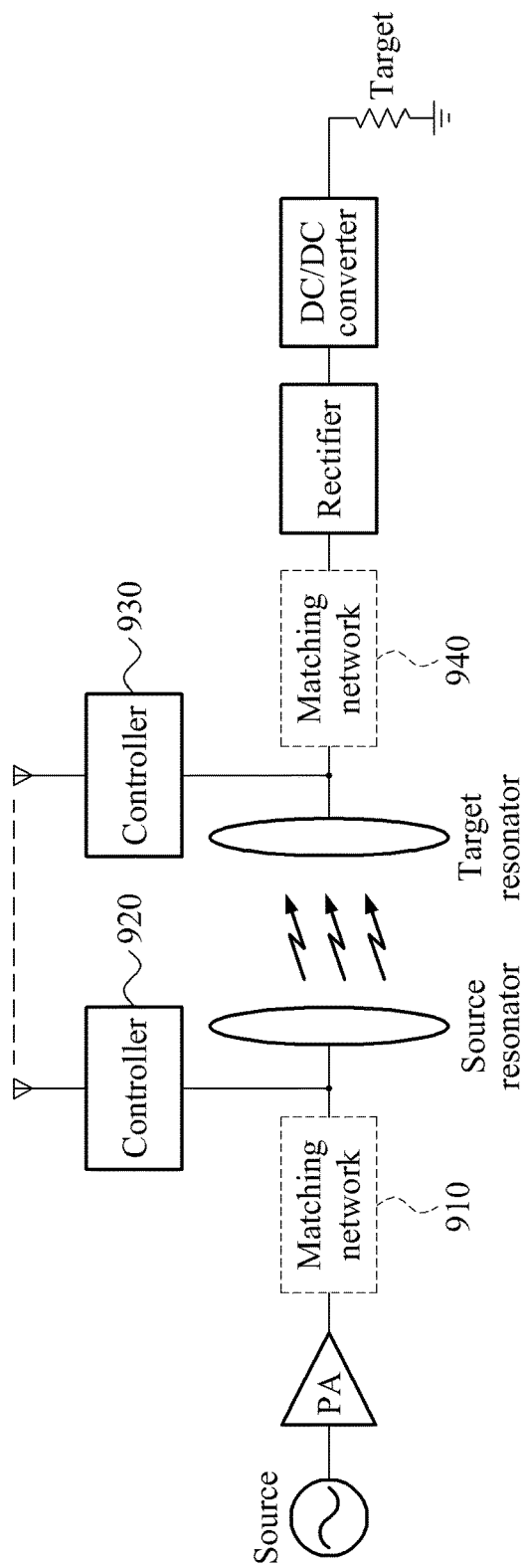
FIG. 9 is a diagram illustrating an example of a wireless power transmission system in which a single wireless power transmitter transmits power to a single wireless power receiver.

FIG. 9 is a diagram illustrating an example of a wireless power transmission system in which a single wireless power transmitter transmits power to a single wireless power receiver. Referring to FIG. 9, a wireless power transmitter includes a source, a power amplifier (PA), a controller 920, and a source resonator. The wireless power transmitter may further include a matching network 910 depending on the circumstances. A wireless power receiver includes a target resonator, a controller 930, a rectifier, a DC/DC converter, and a target. The wireless power receiver may further include a matching network 940 depending on the circumstances.

The source generates a signal having a resonant frequency of the source resonator and the target resonator. The PA amplifies the signal having the resonant frequency. The controller 920 transmits a test power from the PA to the target resonator via the source resonator, and calculates a power transmission efficiency and/or a reflection coefficient based on power received by the target resonator. The controller may obtain information on the power received by the target resonator from the controller 930. The controller 920 may communicate with the controller 930 using an in-band communication scheme or an out-band communication scheme. In the in-band communication scheme, communication is performed in a resonant frequency band used for power transmission. In the out-band communication scheme, communication is performed in a separate communication frequency band that is different from the resonant frequency band used for power transmission.

The power transmission efficiency may be determined based on a ratio of the power received by the target resonator to the test power transmitted to the target resonator via the source resonator. The reflection coefficient may be determined based on a ratio of a power reflected back to the source resonator from the target resonator to the test power transmitted to the target resonator via the source resonator.

The controller 920 determines a value of an impedance to be set by the impedance adjusting unit 220 of FIG. 2 based on the calculated power transmission efficiency and/or the calculated reflection coefficient. The source resonator of FIG. 9 may be the resonator 210 of FIG. 2, and the impedance adjusting unit 220 of FIG. 2 may be located in the source resonator of FIG. 9.

The matching network 910 may be used to match an output impedance of the PA to an input impedance of the source resonator in cooperation with the impedance adjusting unit 220.

The controller 930 receives information on a calculated impedance from the controller 920, and determines a value of an impedance to be set by the impedance adjusting unit 220 of the target resonator based on the information on the calculated impedance. The impedance adjusting unit 220 of the target resonator adjusts an impedance of the target resonator based on the determined value of the impedance.

The matching network 940 may be used to match an output impedance of the target resonator to an input impedance of the rectifier in cooperation with the impedance adjusting unit 220.

Figure 10:
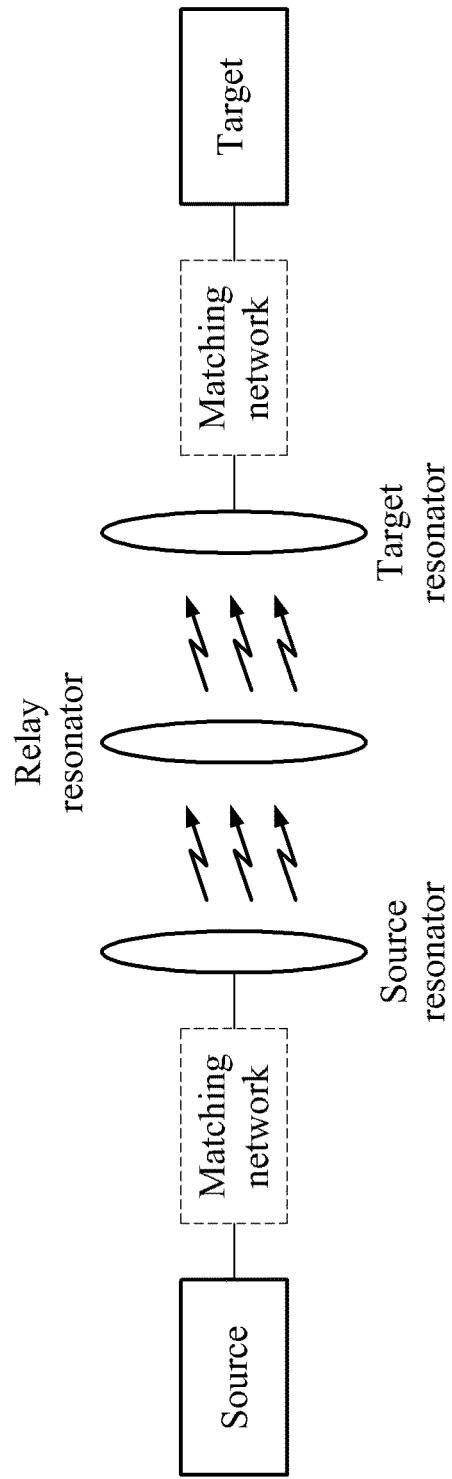
FIG. 10 is a diagram illustrating an example of a wireless power transmission system in which a single wireless power transmitter transmits power to a single wireless power receiver using a single relay resonator.

FIG. 10 is a diagram illustrating an example of a wireless power transmission system in which a single wireless power transmitter transmits power to a single wireless power receiver using a single relay resonator. Referring to FIG. 10, the relay resonator receives power from a source resonator, and transfers the received power to a target resonator. In this example, each of the source resonator, the relay resonator, and the target resonator may include the impedance adjusting unit 220 of FIG. 2.

In an example in which the source resonator includes the impedance adjusting unit 220, the impedance adjusting unit 220 of the source resonator adjusts an impedance of the source resonator to match an output impedance of a source to an input impedance of the relay resonator.

In an example in which the relay resonator includes the impedance adjusting unit 220, the impedance adjusting unit 220 of the relay resonator adjusts an impedance of the relay resonator to match an output impedance of the source resonator to an input impedance of the target resonator.

In an example in which the target resonator includes the impedance adjusting unit 220, the impedance adjusting unit 220 of the target resonator adjusts an impedance of the target resonator to match an output impedance of the relay resonator to an input impedance of a target.

The wireless power transmission system of FIG. 10 may include matching networks. Each of the matching networks may perform impedance matching in cooperation with the impedance adjusting unit 220 of a respective one of the source resonator and the target resonator.

Figure 11:
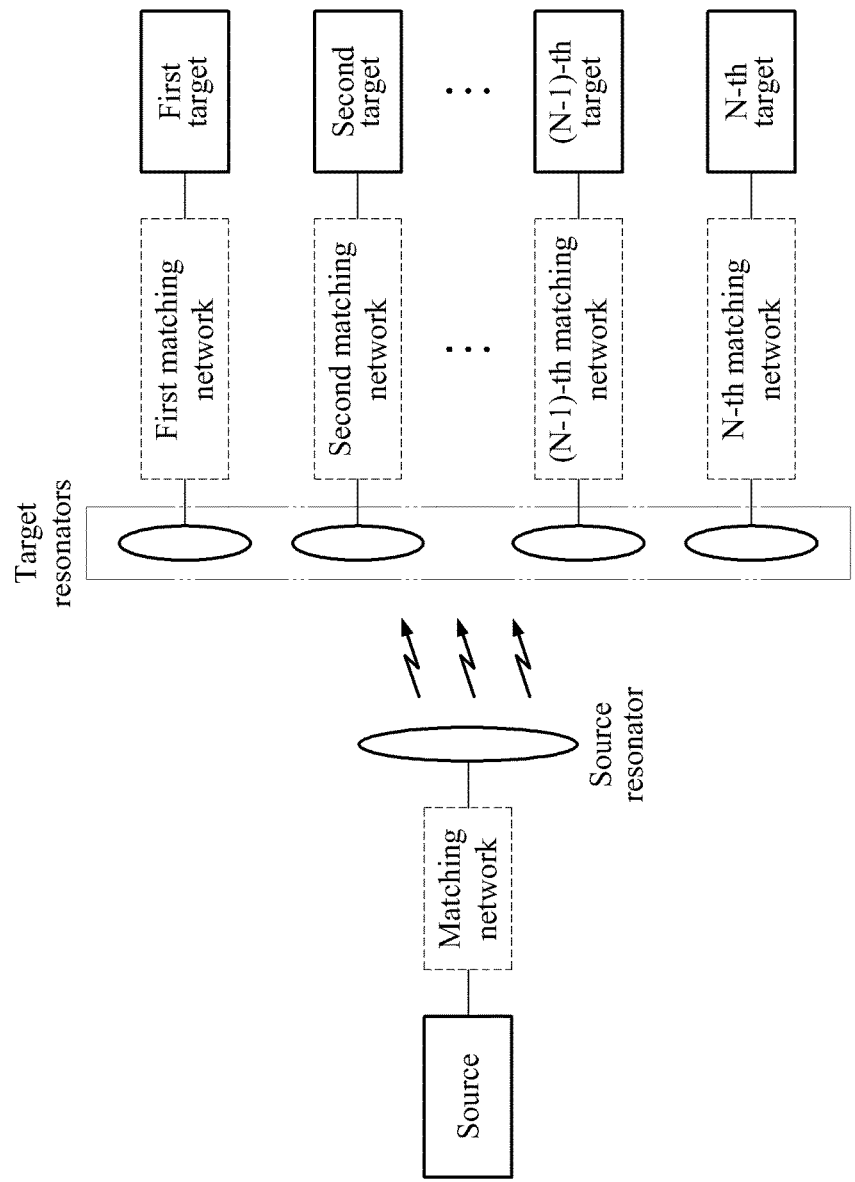
FIG. 11 is a diagram illustrating an example of a wireless power transmission system in which a single wireless power transmitter transmits power to a plurality of wireless power receivers.

FIG. 11 is a diagram illustrating an example of a wireless power transmission system in which a single wireless power transmitter transmits power to a plurality of wireless power receivers. Referring to FIG. 11, a source resonator transfers power to a plurality of target resonators. Each of the source resonator and the target resonators may include the impedance adjusting unit 220 of FIG. 2.

To efficiently transfer power from the source resonator to one of the target resonators, or to some of the target resonators, or to all of the target resonators, an impedance of the source resonator and an impedance of each of the target resonators may need to be adjusted.

If a number of the target resonators changes, an input impedance of each of the target resonators may change. In an example in which the source resonator includes the impedance adjusting unit 220, the impedance adjusting unit 220 adjusts the impedance of the source resonator to match an output impedance of a source to an input impedance of each of the target resonators.

In an example in which a target resonator of a first target includes the impedance adjusting unit 220, the impedance adjusting unit 220 adjusts an impedance of the target resonator based on the adjusted impedance of the source resonator to match an output impedance of the source resonator to an input impedance of the first target.

In an example in which each of the target resonators of the first target through an N-th target includes the impedance adjusting unit 220, the impedance adjusting unit 220 of each of the target resonators adjusts an impedance of a respective one of the target resonators based on the adjusted impedance of the source resonator to match the output impedance of the source resonator to an input impedance of a respective one of the targets.

The wireless power transmission system of FIG. 11 may include a first matching network through an N-th matching network. Each of the matching networks may perform impedance matching in cooperation with the impedance adjusting unit 220 of a respective one of the source resonator and the target resonators.

Figure 12:
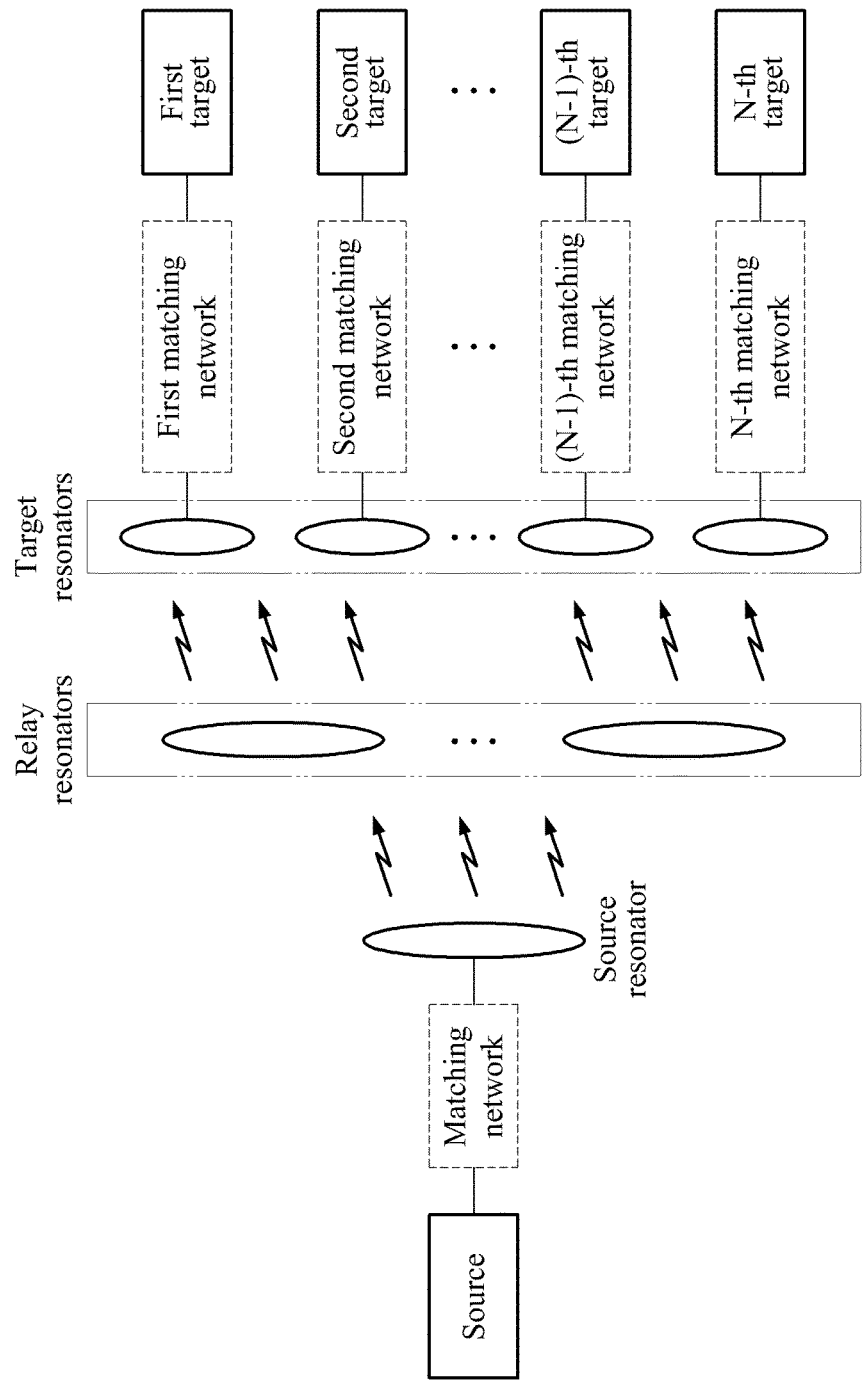
FIG. 12 is a diagram illustrating an example of a wireless power transmission system in which a single wireless power transmitter transmits power to a plurality of wireless power receivers using a plurality of relay resonators.

FIG. 12 is a diagram illustrating an example of a wireless power transmission system in which a single wireless power transmitter transmits power to a plurality of wireless power receivers using a plurality of relay resonators. Referring to FIG. 12, the relay resonators receive power from a source resonator, and transfer the received power to a plurality of target resonators. In this example, each of the source resonator, the relay resonators, and the target resonators may include the impedance adjusting unit 220 of FIG. 2.

In an example in which the source resonator includes the impedance adjusting unit 220, the impedance adjusting unit 220 of the source resonator adjusts an impedance of the source resonator to match an output impedance of a source to an input impedance of each of the relay resonators.

In an example in which each of the relay resonators includes the impedance adjusting unit 220, the impedance adjusting unit 220 of each of the relay resonators adjusts an impedance of a respective one of the relay resonators to match an output impedance of the source resonator to an input impedance of each of the target resonators.

In an example in which each of the target resonators includes the impedance adjusting unit 220, the impedance adjusting unit 220 of each of the target resonators adjusts an impedance of a respective one of the target resonators to match an output impedance of each of the relay resonators to an input impedance of a respective one of a first target through an N-th target.

The wireless power transmission system of FIG. 12 may include a first matching network through an N-th matching network. Each of the matching networks may perform impedance matching in cooperation with the impedance adjusting unit 220 of a respective one of the source resonator and the target resonators.

Figure 13:
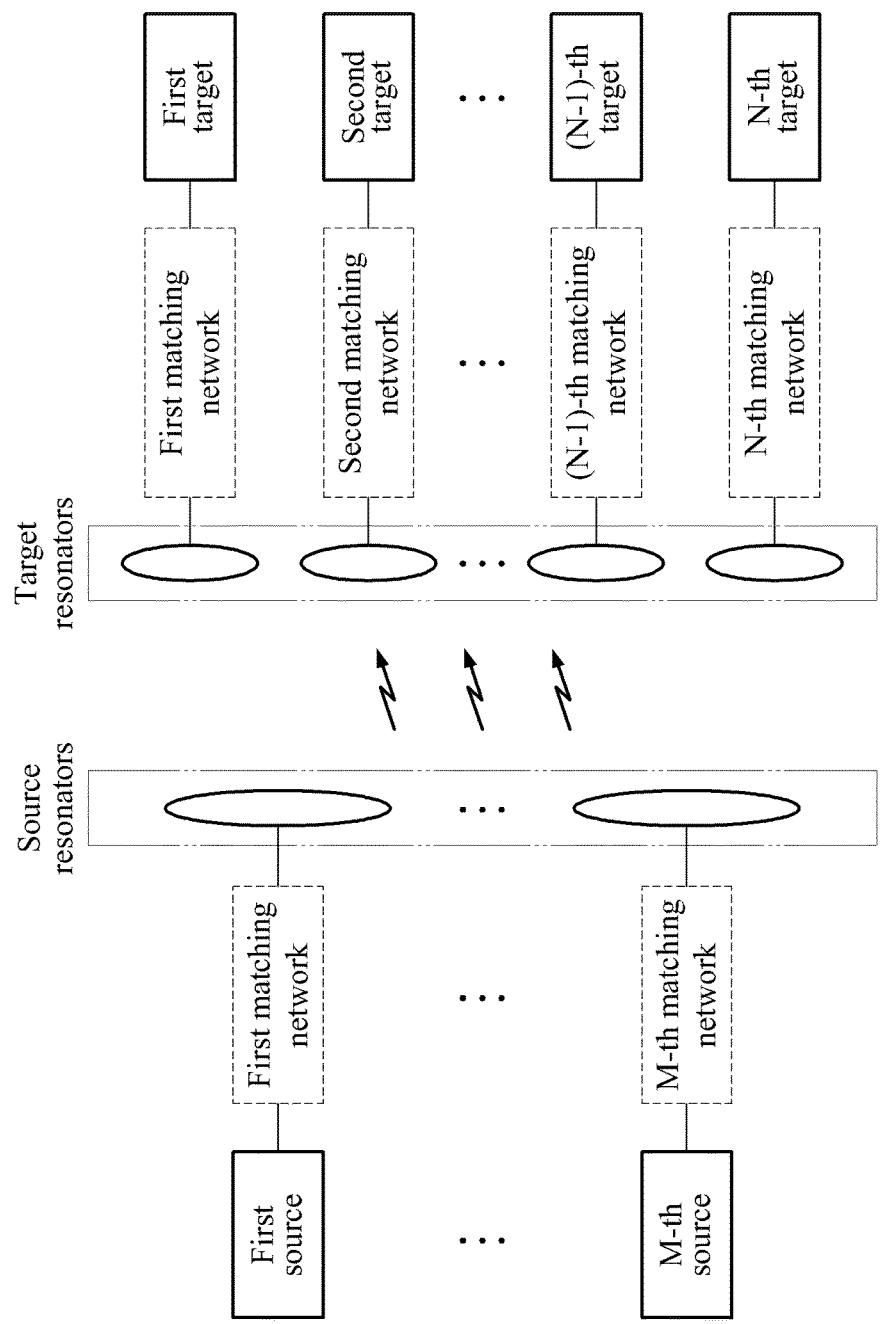
FIG. 13 is a diagram illustrating an example of a wireless power transmission system in which a plurality of wireless power transmitters transmit power to a plurality of wireless power receivers.

FIG. 13 is a diagram illustrating an example of a wireless power transmission system in which a plurality of wireless power transmitters transmit power to a plurality of wireless power receivers. Referring to FIG. 13, a plurality of source resonators transfer power to a plurality of target resonators. In this example, each of the source resonators and the target resonators may include the impedance adjusting unit 220 of FIG. 2.

To efficiently transfer power from the source resonators to one of the target resonators, or to some of the target resonators, or to all of the target resonators, an impedance of each of the source resonators and an impedance of each of the target resonators may need to be adjusted.

If a number of the target resonators changes, an input impedance of each of the target resonators may change. In an example in which a source resonator of a first source includes the impedance adjusting unit 220, the impedance adjusting unit 220 adjusts an impedance of the source resonator to match an output impedance of the first source to an input impedance of each of the target resonators.

In an example in which a source resonator of an M-th source includes the impedance adjusting unit 220, the impedance adjusting unit 220 adjusts an impedance of the source resonator to match an output impedance of the M-th source to an input impedance of each of the target resonators.

In an example in which a target resonator of a first target includes the impedance adjusting unit 220, the impedance adjusting unit 220 adjusts an impedance of the target resonator, based on an adjusted impedance of a source resonator, to match an output impedance of the source resonator to an input impedance of the first target.

In an example in which each of the target resonators includes the impedance adjusting unit 220, the impedance adjusting unit 220 adjusts an impedance of each of the target resonators, based on an adjusted impedance of a source resonator, to match an output impedance of the source resonator to an input impedance of each of targets.

The wireless power transmission system of FIG. 13 may include matching networks, for example, a first matching network through an M-th matching network, and a first matching network through an N-th matching network. Each of the matching networks may perform impedance matching in cooperation with the impedance adjusting unit 220.

Figure 14:
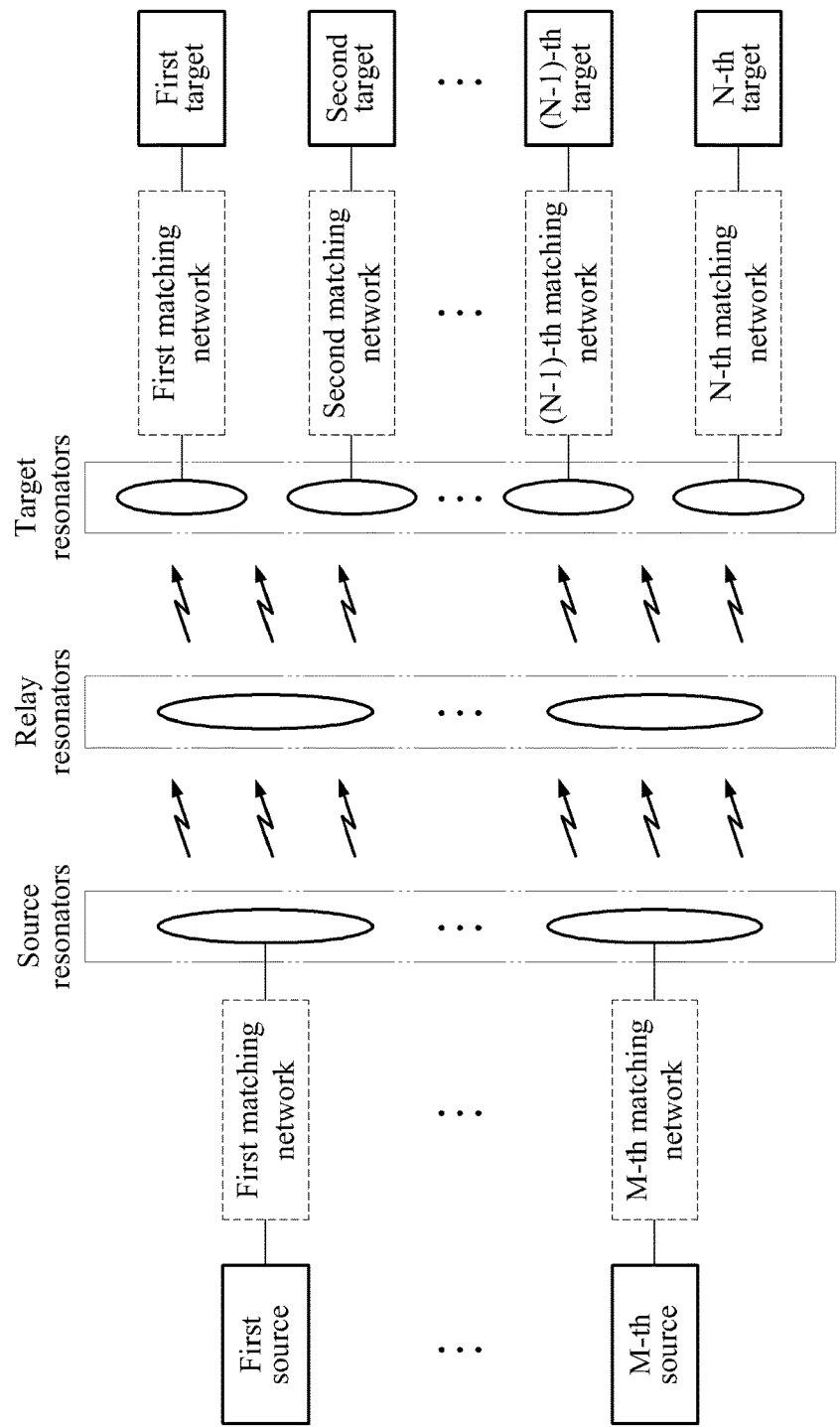
FIG. 14 is a diagram illustrating an example of a wireless power transmission system in which a plurality of wireless power transmitters transmit power to a plurality of wireless power receivers using a plurality of relay resonators.

FIG. 14 is a diagram illustrating an example of a wireless power transmission system in which a plurality of wireless power transmitters transmit power to a plurality of wireless power receivers using a plurality of relay resonators. Referring to FIG. 14, the relay resonators receive power from a plurality of source resonators, and transfer the received power to a plurality of target resonators. In this example, each of the source resonators, the relay resonators, and the target resonators may include the impedance adjusting unit 220 of FIG. 2.

In an example in which each of the relay resonators includes the impedance adjusting unit 220, the impedance adjusting unit 220 adjusts an impedance of each of the relay resonators to match an output impedance of each of the source resonators to an input impedance of each of the target resonators.

The wireless power transmission system of FIG. 14 may include matching networks, for example, a first matching network through an M-th matching network, and a first matching network through an N-th matching network. Each of the matching networks may perform impedance matching in cooperation with the impedance adjusting unit 220.

In the following description of FIGS. 15A through 17B, unless otherwise indicated, the term "resonator" may refer to both a source resonator and a target resonator. The resonators of FIGS. 15A through 17B may be used as the resonators of FIGS. 1 through 14.

Figure 15A:
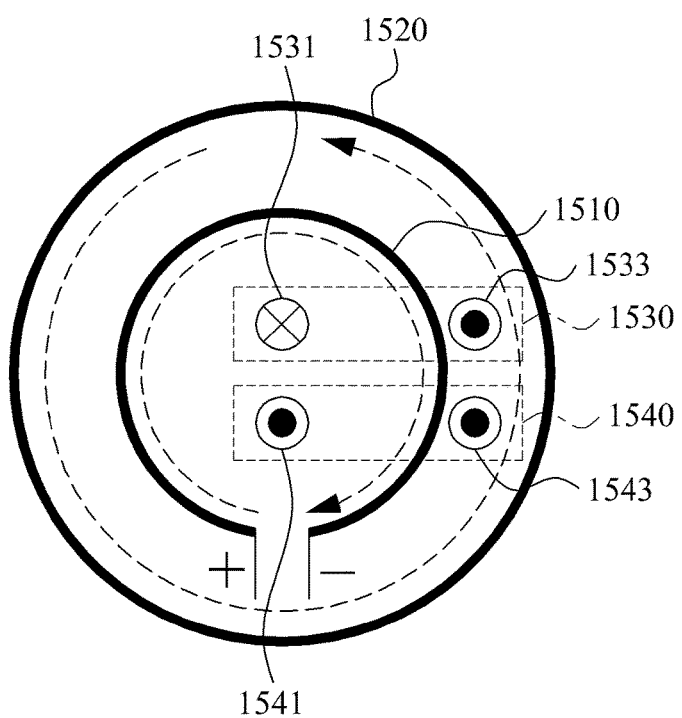
FIGS. 15A and 15B are diagrams illustrating examples of a distribution of a magnetic field in a feeder and a resonator of a wireless power transmitter.
Figure 15B:
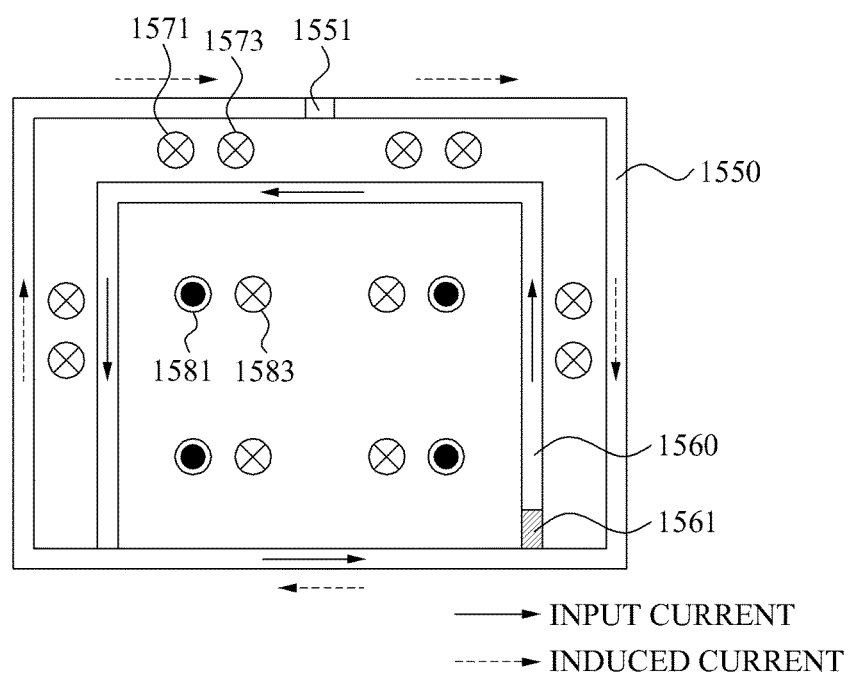

FIGS. 15A and 15B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 15A is a diagram illustrating an example of a structure of a wireless power transmitter in which a feeder 1510 and a resonator 1520 do not have a common ground. Referring to FIG. 15A, as an input current flows into the feeder 1510 through a terminal labeled "+" and out of the feeder 1510 through a terminal labeled "−", a magnetic field 1530 is formed by the input current. A direction 1531 of the magnetic field 1530 inside the feeder 1510 is into the plane of FIG. 15A, and is opposite to a direction 1533 of the magnetic field 1530 outside the feeder 1510, which is out of the plane of FIG. 15A. The magnetic field 1530 formed by the feeder 1510 induces a current to flow in the resonator 1520. The direction of the induced current in the resonator 1520 is opposite to a direction of the input current in the feeder 1510 as indicated by the dashed lines with arrowheads in FIG. 15A.

The induced current in the resonator 1520 forms a magnetic field 1540. A direction of the magnetic field formed by the induced current is the same at all positions inside the resonator 1520, and is out of the plane of FIG. 15A. Accordingly, a direction 1541 of the magnetic field 1540 formed by the resonator 1520 inside the feeder 1510 is the same as a direction 1543 of the magnetic field 1540 formed by the resonator 1520 outside the feeder 1510.

Consequently, when the magnetic field 1530 formed by the feeder 1510 and the magnetic field 1540 formed by the resonator 1520 are combined, the strength of the total magnetic field inside the resonator 1520 decreases inside the feeder 1510, but increases outside the feeder 1510. In an example in which power is supplied to the resonator 1520 through the feeder 1510 configured as illustrated in FIG. 15A, the strength of the total magnetic field decreases in the center of the resonator 1520, but increases outside the resonator 1520.

In another example in which a magnetic field is randomly or not uniformly distributed in the resonator 1520, it is difficult to perform impedance matching since an input impedance will frequently vary. Additionally, when the strength of the total magnetic field increases, an efficiency of wireless power transmission increases. Conversely, when the strength of the total magnetic field decreases, the efficiency of wireless power transmission decreases. Accordingly, the power transmission efficiency is reduced on average when the magnetic field is randomly or not uniformly distributed in the resonator 1520 compared to when the magnetic field is uniformly distributed in the resonator 1520.

FIG. 15B is a diagram illustrating an example of a structure of a wireless power transmitter in which a resonator 1550 and a feeder 1560 have a common ground. The resonator 1550 includes a capacitor 1551. The feeder 1560 receives a radio frequency (RF) signal via a port 1561. When the RF signal is input to the feeder 1560, an input current is generated in the feeder 1560. The input current flowing in the feeder 1560 forms a magnetic field, and a current is induced in the resonator 1550 by the magnetic field. Additionally, another magnetic field is formed by the induced current flowing in the resonator 1550. In this example, a direction of the input current flowing in the feeder 1560 is opposite to a direction of the induced current flowing in the resonator 1550. Accordingly, in a region between the resonator 1550 and the feeder 1560, a direction 1571 of the magnetic field formed by to the input current is the same as a direction 1573 of the magnetic field formed by the induced current, and thus the strength of the total magnetic field increases in the region between the resonator 1550 and the feeder 1560. Conversely, inside the feeder 1560, a direction 1581 of the magnetic field formed by the input current is opposite to a direction 1583 of the magnetic field formed by the induced current, and thus the strength of the total magnetic field decreases inside the feeder 1560. Therefore, the strength of the total magnetic field decreases in the center of the resonator 1550, but increases near an outer periphery of the resonator 1550. Thus, a magnetic field may be more uniformly distributed in the resonator 1550, compared to the structure of FIG. 15A.

An input impedance may be adjusted by adjusting an internal area of the feeder 1560. The input impedance refers to an impedance viewed in a direction from the feeder 1560 to the resonator 1550. When the internal area of the feeder 1560 is increased, the input impedance is increased. Conversely, when the internal area of the feeder 1560 is decreases, the input impedance is decreased.

Figure 16A:
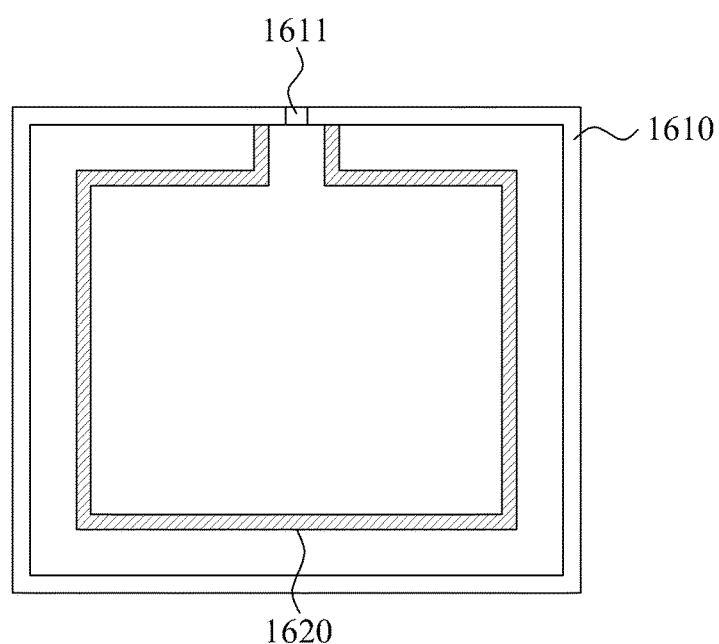
FIGS. 16A and 16B are diagrams illustrating an example of a wireless power transmitter including a feeder and a resonator.
Figure 16B:
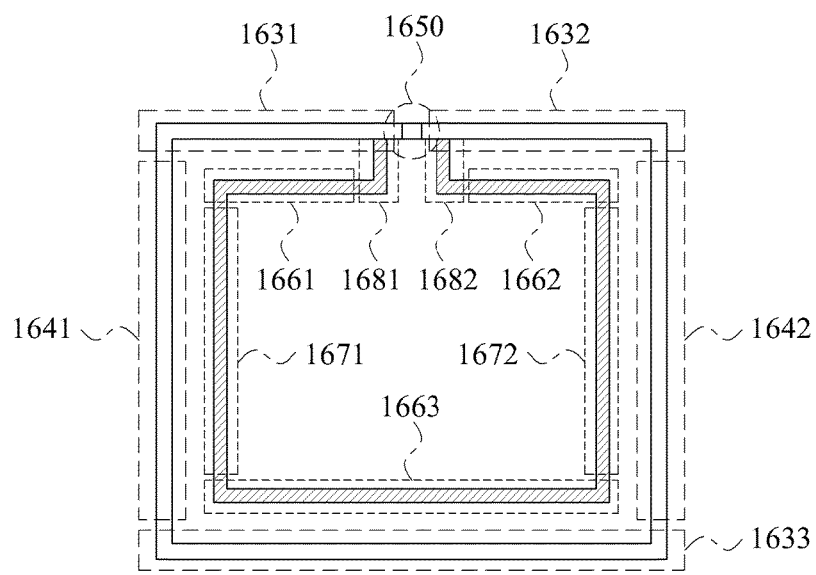

FIGS. 16A and 16B are diagrams illustrating an example of a wireless power transmitter including a resonator and a feeder. Referring to FIG. 16A, the wireless power transmitter includes a resonator 1610 and a feeder 1620. The resonator 1610 includes a capacitor 1611. The feeder 1620 is electrically connected to both ends of the capacitor 1611.

FIG. 16B is a diagram illustrating in greater detail a structure of the wireless power transmitter of FIG. 16A. The resonator 1610 includes a first transmission line (not identified by a reference numeral in FIG. 16B, but formed by various elements in FIG. 16B as discussed below), a first conductor 1641, a second conductor 1642, and at least one capacitor 1650.

The capacitor 1650 is inserted in series between a first signal conducting portion 1631 and a second signal conducting portion 1632, causing an electric field to be concentrated in the capacitor 1650. Generally, a transmission line includes at least one conductor in an upper portion of the transmission line, and at least one conductor in a lower portion of the transmission line. A current may flow through the at least one conductor disposed in the upper portion of the transmission line, and the at least one conductor disposed in the lower portion of the transmission line may be electrically grounded. In this example, a conductor disposed in an upper portion of the first transmission line in FIG. 16B is separated into two portions that will be referred to as the first signal conducting portion 1631 and the second signal conducting portion 1632. A conductor disposed in a lower portion of the first transmission line in FIG. 16B will be referred to as a first ground conducting portion 1633.

As illustrated in FIG. 16B, the resonator 1610 has a generally two-dimensional (2D) structure. The first transmission line includes the first signal conducting portion 1631 and the second signal conducting portion 1632 in the upper portion of the first transmission line, and includes the first ground conducting portion 1633 in the lower portion of the first transmission line. The first signal conducting portion 1631 and the second signal conducting portion 1632 are disposed to face the first ground conducting portion 1633. A current flows through the first signal conducting portion 1631 and the second signal conducting portion 1632.

One end of the first signal conducting portion 1631 is connected to one end of the first conductor 1641, the other end of the first signal conducting portion 1631 is connected to one end of the capacitor 1650, and the other end of the first conductor 1641 is connected to one end of the first ground conducting portion 1633. One end of the second signal conducting portion 1632 is connected to one end of the second conductor 1642, the other end of the second signal conducting portion 1632 is connected to the other end of the capacitor 1650, and the other end of the second conductor 1642 is connected to the other end of the first ground conducting portion 1633. Accordingly, the first signal conducting portion 1631, the second signal conducting portion 1632, the first ground conducting portion 1633, the first conductor 1641, and the second conductor 1642 are connected to each other, causing the resonator 1610 to have an electrically closed loop structure. The term "loop structure" includes a polygonal structure, a circular structure, a rectangular structure, and any other geometrical structure that is closed, i.e., that does not have any opening in its perimeter. The phrase "having a loop structure" indicates a structure that is electrically closed.

The capacitor 1650 is inserted into an intermediate portion of the first transmission line. In the example in FIG. 16B, the capacitor 1650 is inserted into a space between the first signal conducting portion 1631 and the second signal conducting portion 1632. The capacitor 1650 may be a lumped element capacitor, a distributed element capacitor, or any other type of capacitor known to one of ordinary skill in the art. For example, a distributed element capacitor may include zigzagged conductor lines and a dielectric material having a relatively high permittivity disposed between the zigzagged conductor lines.

The capacitor 1650 inserted into the first transmission line may cause the resonator 1610 to have a characteristic of a metamaterial. A metamaterial is a material having a predetermined electrical property that is not found in nature, and thus may have an artificially designed structure. All materials existing in nature have a magnetic permeability and a permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial having a magnetic permeability and/or a permittivity that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the magnetic permeability of the metamaterial and a sign of the permittivity of the metamaterial.

If the capacitor 1650 is a lumped element capacitor and a capacitance of the capacitor 1650 is appropriately determined, the resonator 1610 may have a characteristic of the metamaterial. If the resonator 1610 is caused to have a negative magnetic permeability by appropriately adjusting the capacitance of the capacitor 1650, the resonator 1610 may also be referred to as an MNG resonator. Various criteria may be applied to determine the capacitance of the capacitor 1650. For example, the various criteria may include a criterion for enabling the resonator 1610 to have the characteristic of the metamaterial, a criterion for enabling the resonator 1610 to have a negative magnetic permeability at a target frequency, a criterion for enabling the resonator 1610 to have a zeroth order resonance characteristic at the target frequency, and any other suitable criterion. Based on any one or any combination of the aforementioned criteria, the capacitance of the capacitor 1650 may be determined.

The resonator 1610, hereinafter referred to as the MNG resonator 1610, may have a zeroth order resonance characteristic of having a resonant frequency when a propagation constant is "0". If the resonator 1610 has the zeroth order resonance characteristic, the resonant frequency is independent of a physical size of the MNG resonator 1610. By changing the capacitance of the capacitor 1650, the resonant frequency of the MNG resonator 1610 may be changed without changing the physical size of the MNG resonator 1610.

In a near field, the electric field is concentrated in the capacitor 1650 inserted into the first transmission line, causing the magnetic field to become dominant in the near field. The MNG resonator 1610 has a relatively high Q-factor when the capacitor 1650 is a lumped element capacitor, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 16B, a magnetic core passing through the MNG resonator 1610 may be provided to increase a power transmission distance.

Referring to FIG. 16B, the feeder 1620 includes a second transmission line (not identified by a reference numeral in FIG. 16B, but formed by various elements in FIG. 16B as discussed below), a third conductor 1671, a fourth conductor 1672, a fifth conductor 1681, and a sixth conductor 1682.

The second transmission line includes a third signal conducting portion 1661 and a fourth signal conducting portion 1662 in an upper portion of the second transmission line, and includes a second ground conducting portion 1663 in a lower portion of the second transmission line. The third signal conducting portion 1661 and the fourth signal conducting portion 1662 are disposed to face the second ground conducting portion 1663. A current flows through the third signal conducting portion 1661 and the fourth signal conducting portion 1662.

One end of the third signal conducting portion 1661 is connected to one end of the third conductor 1671, the other end of the third signal conducting portion 1661 is connected to one end of the fifth conductor 1681, and the other end of the third conductor 1671 is connected to one end of the second ground conducting portion 1663. One end of the fourth signal conducting portion 1662 is connected to one end of the fourth conductor 1672, the other end of the fourth signal conducting portion 1662 is connected to one end of the sixth conductor 1682, and the other end of the fourth conductor 1672 is connected to the other end of the second ground conducting portion 1663. The other end of the fifth conductor 1681 is connected to the first signal conducting portion 1631 at or near where the first signal conducting portion 1631 is connected to one end of the capacitor 1650, and the other end of the sixth conductor 1682 is connected to the second signal conducting portion 1632 at or near where the second signal conducting portion 1632 is connected to the other end of the capacitor 1650. Thus, the fifth conductor 1681 and the sixth conductor 1682 are connected in parallel with both ends of the capacitor 1650. The fifth conductor 1681 and the sixth conductor 1682 may be used as an input port to receive an RF signal as an input.

Accordingly, the third signal conducting portion 1661, the fourth signal conducting portion 1662, the second ground conducting portion 1663, the third conductor 1671, the fourth conductor 1672, the fifth conductor 1681, the sixth conductor 1682, and the resonator 1610 are connected to each other, causing the resonator 1610 and the feeder 1620 to have an electrically closed loop structure. The term "loop structure" includes a polygonal structure, a circular structure, a rectangular structure, and any other geometrical structure that is closed, i.e., that does not have any opening in its perimeter. The phrase "having a loop structure" indicates a structure that is electrically closed.

If an RF signal is input to the fifth conductor 1681 or the sixth conductor 1682, an input current flows through the feeder 1620 and the resonator 1610, generating a magnetic field that induces a current in the resonator 1610. A direction of the input current flowing through the feeder 1620 is identical to a direction of the induced current flowing through the resonator 1610, thereby causing the strength of the total magnetic field to increase in the center of the resonator 1610, and decrease near the outer periphery of the resonator 1610.

An input impedance is determined by an area of a region between the resonator 1610 and the feeder 1620. Accordingly, a separate matching network used to match the input impedance to an output impedance of a power amplifier may not be necessary. However, if a matching network is used, the input impedance may be adjusted by adjusting a size of the feeder 1620, and accordingly a structure of the matching network may be simplified. The simplified structure of the matching network reduces a matching loss of the matching network.

The second transmission line, the third conductor 1671, the fourth conductor 1672, the fifth conductor 1681, and the sixth conductor 1682 of the feeder 1620 may have a structure identical to a structure of the resonator 1610. For example, if the resonator 1610 has a loop structure, the feeder 1620 may also have a loop structure. As another example, if the resonator 1610 has a circular structure, the feeder 1620 may also have a circular structure.

Figure 17A:
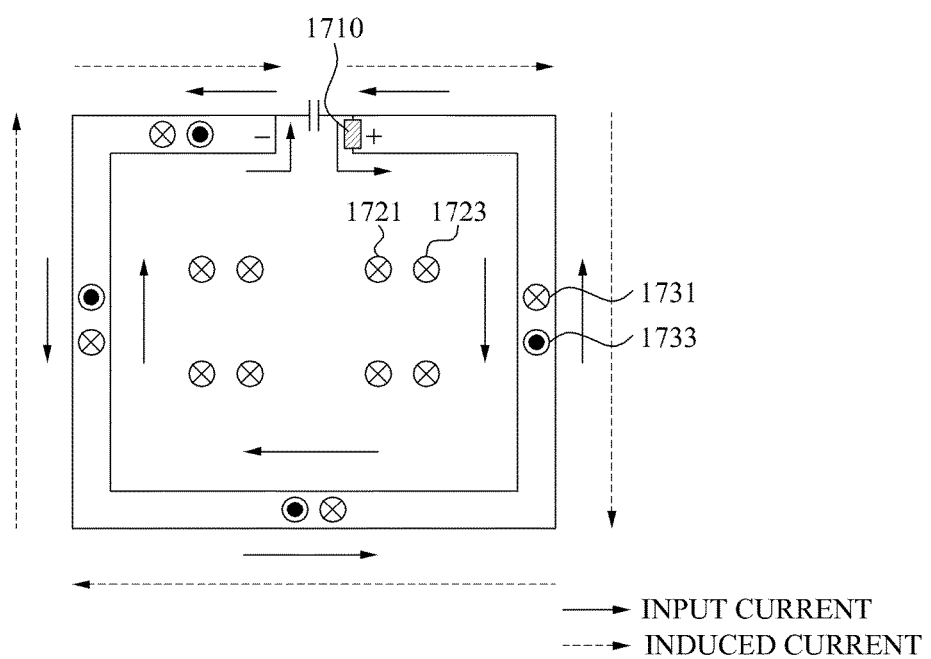
FIG. 17A is a diagram illustrating an example of a distribution of a magnetic field inside a resonator produced by feeding of a feeder.

FIG. 17A is a diagram illustrating an example of a distribution of a magnetic field inside a resonator produced by feeding of a feeder. FIG. 17A more simply illustrates the resonator 1610 and the feeder 1620 of FIGS. 16A and 16B, and the names of the various elements in FIG. 16B will be used in the following description of FIG. 17A without reference numerals.

A feeding operation may be an operation of supplying power to a source resonator in wireless power transmission, or an operation of supplying AC power to a rectification unit in wireless power transmission. FIG. 17A illustrates a direction of an input current flowing in the feeder, and a direction of an induced current flowing in the source resonator. Additionally, FIG. 17A illustrates a direction of a magnetic field formed by the input current of the feeder, and a direction of a magnetic field formed by the induced current of the source resonator.

Referring to FIG. 17A, the fifth conductor or the sixth conductor of the feeder may be used as an input port 1710. In the example in FIG. 17A, the sixth conductor of the feeder is being used as the input port 1710. An RF signal is input to the input port 1710. The RF signal may be output from a power amplifier. The power amplifier may increase and decrease an amplitude of the RF signal based on a power requirement of a target device. The RF signal input to the input port 1710 is represented in FIG. 17A as an input current flowing in the feeder. The input current flows in a clockwise direction in the feeder along the second transmission line of the feeder. The fifth conductor and the sixth conductor of the feeder are electrically connected to the resonator. More specifically, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator along the first transmission line of the resonator. The input current flowing in the resonator generates a magnetic field, and the magnetic field induces a current in the resonator. The induced current flows in a clockwise direction in the resonator along the first transmission line of the resonator. The induced current in the resonator transfers energy to the capacitor of the resonator, and also generates a magnetic field. In FIG. 17A, the input current flowing in the feeder and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 17A, inside the feeder, a direction 1721 of the magnetic field generated by the input current flowing in the feeder is identical to a direction 1723 of the magnetic field generated by the induced current flowing in the resonator. Accordingly, the strength of the total magnetic field increases inside the feeder.

In contrast, as illustrated in FIG. 17A, in a region between the feeder and the resonator, a direction 1733 of the magnetic field generated by the input current flowing in the feeder 1620 is opposite to a direction 1731 of the magnetic field generated by the induced current flowing in the resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 17A, since the feeder is electrically connected to both ends of the capacitor of the resonator, the direction of the induced current in the resonator is identical to the direction of the input current in the feeder. Since the direction of the induced current in the resonator is identical to the direction of the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, 1610, thereby compensating for the normal characteristic of the resonator having the loop structure in which the magnetic field decreases in the center of the resonator, and increases near an outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 17B:
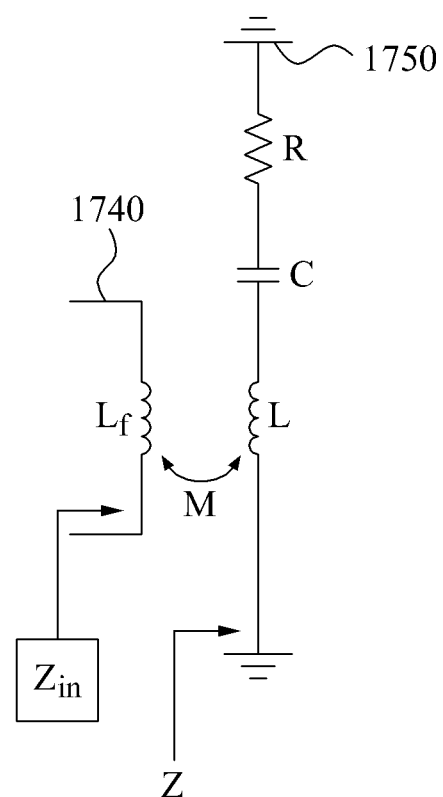
FIG. 17B is a diagram illustrating examples of equivalent circuits of a feeder and a resonator.

FIG. 17B is a diagram illustrating examples of equivalent circuits of a feeder and a resonator. Referring to FIG. 17B, a feeder 1740 and a resonator 1750 may be represented by the equivalent circuits in FIG. 17B. The feeder 1740 is represented as an inductor having an inductance $L_f$, and the resonator 1750 is represented as a series connection of an inductor having an inductance L coupled to the inductance $L_f$ of the feeder 1740 by a mutual inductance M, a capacitor having a capacitance C, and a resistor having a resistance R. An input impedance $Z_{in}$ viewed in a direction from the feeder 1740 to the resonator 1750 may be expressed by the following Equation 1:

$$Z_{in} = \frac{(\omega M)^2}{Z} \qquad (1)$$

In Equation 1, M denotes a mutual inductance between the feeder 1740 and the resonator 1750, ω denotes a resonant frequency of the feeder 1740 and the resonator 1750, and Z denotes an impedance viewed in a direction from the resonator 1750 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 1740 and the resonator 1750. The area of the region between the feeder 1740 and the resonator 1750 may be adjusted by adjusting a size of the feeder 1740, thereby adjusting the mutual inductance M and the input impedance $Z_{in}$. Since the input impedance $Z_{in}$ may be adjusted by adjusting the size of the feeder 1740, it may be unnecessary to use a separate matching network to perform impedance matching with an output impedance of a power amplifier.

In a target resonator and a feeder included in a wireless power receiver, a magnetic field may be distributed as illustrated in FIG. 17A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 17A, a direction of the induced current flowing in the target resonator will be identical to a direction of the induced current flowing in the feeder. Accordingly, for the reasons discussed above in connection with FIG. 17A, the strength of the total magnetic field will increase inside the feeder, and will decrease in a region between the feeder and the target resonator.

Figure 18:
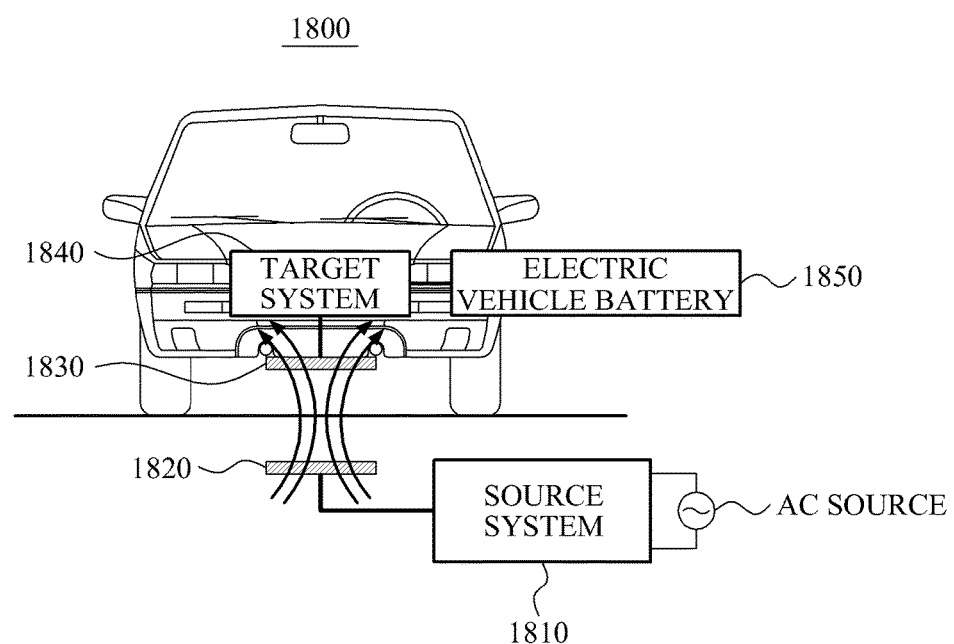
FIG. 18 is a diagram illustrating an example of an electric vehicle charging system.

FIG. 18 is a diagram illustrating an example of an electric vehicle charging system. Referring to FIG. 18, an electric vehicle charging system 1800 includes a source system 1810, a source resonator 1820, a target resonator 1830, a target system 1840, and an electric vehicle battery 1850.

In one example, the electric vehicle charging system 1800 has a structure similar to the structure of the wireless power transmission system of FIG. 1. The source system 1810 and the source resonator 1820 in the electric vehicle charging system 1800 operate as a source. The target resonator 1830 and the target system 1840 in the electric vehicle charging system 1800 operate as a target.

In one example, the source system 1810 includes a variable SMPS, a power amplifier, a matching network, a TX controller, a communication unit, and a power detector similar to those of the source 110 of FIG. 1. In one example, the target system 1840 includes a matching network, a rectification unit, a DC/DC converter, a communication unit, an RX controller, a voltage detector, and a power detector similar to those of the target 120 of FIG. 1. The electric vehicle battery 1850 is charged by the target system 1840. The electric vehicle charging system 1800 may use a resonant frequency in a band of a few kilohertz (kHz) to tens of MHz.

The source system 1810 generates power based on a type of the vehicle being charged, a capacity of the electric vehicle battery 1850, and a charging state of the electric vehicle battery 1850, and wirelessly transmits the generated power to the target system 1840 via magnetic coupling between the source resonator 1820 and the target resonator 1830.

The source system 1810 may control an alignment of the source resonator 1820 and the target resonator 1830. For example, when the source resonator 1820 and the target resonator 1830 are not aligned, the TX controller of the source system 1810 may transmit a message to the target system 1840 to control the alignment of the source resonator 1820 and the target resonator 1830.

For example, when the target resonator 1830 is not located in a position enabling maximum magnetic coupling, the source resonator 1820 and the target resonator 1830 are not properly aligned. When a vehicle does not stop at a proper position to accurately align the source resonator 1820 and the target resonator 1830, the source system 1810 may instruct a position of the vehicle to be adjusted to control the source resonator 1820 and the target resonator 1830 to be aligned. However, this is just an example, and other methods of aligning the source resonator 1820 and the target resonator 1830 may be used.

The source system 1810 and the target system 1840 may transmit or receive an ID of a vehicle and exchange various messages by communicating with each other.

The descriptions of FIGS. 2 through 17B are also applicable to the electric vehicle charging system 1800. However, the electric vehicle charging system 1800 may use a resonant frequency in a band of a few kHz to tens of MHz, and may transmit power that is equal to or higher than tens of watts to charge the electric vehicle battery 1850.

In various examples described above, a wireless power transmitter, a wireless power relay apparatus, and a wireless power receiver may each adjust a number of impedance-matching bars that are connected or a size of driving coil using switches of a resonator, and thus it is possible to adjust an impedance of the resonator.

Additionally, in various examples described above, a wireless power transmitter may adjust a number of impedance-matching bars that are connected or a size of driving coil using switches of a resonator, despite a change in a number of wireless power receivers to be supplied with power, a change in locations of wireless power receivers to be supplied with power, and a change in a distance between the wireless power transmitter and a wireless power receiver that is receiving wireless power. Thus, it is possible to perform impedance matching between the wireless power transmitter and a wireless power receiver.

Furthermore, in various examples described above, a wireless power transmitter may perform impedance matching with a wireless power receiver, without using a matching network outside a source resonator, and thus it is possible to transmit power with high efficiency.

Moreover, in various examples described above, a wireless power transmission system including a wireless power transmitter, a wireless power relay apparatus, and a wireless power receiver may perform impedance matching using an inner loop of a resonator, even in a complicated wireless power transmission environment, such as an indoor room. Thus, it is possible to adaptively perform impedance matching, while minimizing use of an external impedance matching network. The inner loop may include impedance-matching bars and switches.

The TX controller 114, the communication unit 115, the communication unit 124, the RX controller 125, the controller 920, and the controller 930 described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a source resonator configured to wirelessly transmit power via magnetic coupling with a target resonator;
   a controller configured to determine a number of a plurality of switches to be turned on or off based on either one or both of a power transmission efficiency and a reflection coefficient; and
   an impedance adjusting unit, comprising first and a second impedance-matching bars, configured to adjust an impedance of the source resonator using the determined number of the plurality of the switches and the first and the second impedance-matching bars,
   wherein:
   each of the first impedance-matching bars is located symmetrically to a respective one of the second impedance-matching bars with respect to a respective one of the switches,
   each of the first impedance-matching bars and the respective one of the second impedance-matching bars correspond to the respective one of the switches, and
   each of the first impedance-matching bars and the respective one of the second impedance-matching bars are electrically connected in response to the respective one of the switches being turned on.

2. The wireless power transmitter of claim 1, wherein the impedance adjusting unit comprises at least one switch, of the plurality of switches, configured to electrically connect together at least two impedance-matching bars among the plurality of impedance-matching bars.

3. The wireless power transmitter of claim 1, wherein the controller is configured to:
   transmit test power via the source resonator; and
   calculate either one or both of the power transmission efficiency and the reflection coefficient based on power received via the target resonator.

4. The wireless power transmitter of claim 1, wherein the source resonator comprises:
   a first transmission line comprising:
   a first signal conducting portion;
   a second signal conducting portion; and
   a first ground conducting portion corresponding to the first signal conducting portion and the second signal conducting portion;

a first conductor electrically connecting the first signal conducting portion to the first ground conducting portion;
a second conductor electrically connecting the second signal conducting portion to the first ground conducting portion; and
a capacitor connected in series between the first signal conducting portion and the second signal conducting portion with respect to a current flowing through the first signal conducting portion and the second signal conducting portion.

5. The wireless power transmitter of claim 4, wherein the impedance adjusting unit comprises:
a third conductor electrically connected to the first ground conducting portion;
a plurality of fourth conductors electrically connected to the third conductor;
a plurality of fifth conductors electrically connectable to and disconnectable from the plurality of fourth conductors via the plurality of switches; and
a sixth conductor electrically connected to the plurality of fifth conductors; and
the plurality of fourth conductors comprises the first impedance-matching bars and the plurality of fifth conductors comprises the second impedance-matching bars.

6. The wireless power transmitter of claim 1, wherein the source resonator comprises:
a first transmission line comprising:
a first signal conducting portion;
a second signal conducting portion; and
a first ground conducting portion corresponding to the first signal conducting portion and the second signal conducting portion;
a first conductor electrically connecting the first signal conducting portion to the first ground conducting portion;
a second conductor electrically isolated from the first ground conducting portion and electrically connected to the second signal conducting portion; and
a capacitor connected in series between the first signal conducting portion and the second signal conducting portion with respect to a current flowing through the first signal conducting portion and the second signal conducting portion;
wherein the impedance adjusting unit comprises:
a plurality of third conductors electrically connected to the first conductor;
a plurality of fourth conductors electrically connected to the second conductor; and
the plurality of switches configured to electrically connect the plurality of third conductors to the plurality of fourth conductors; and
wherein the plurality of third conductors comprises the first impedance-matching bars and the plurality of fourth conductors comprises the second impedance-matching bars.

7. The wireless power transmitter of claim 1, wherein the source resonator comprises:
a first transmission line comprising:
a first signal conducting portion;
a second signal conducting portion; and
a first ground conducting portion corresponding to the first signal conducting portion and the second signal conducting portion;

a first conductor electrically connecting the first signal conducting portion to the first ground conducting portion;
a second conductor electrically connected to the first signal conducting portion;
a third conductor electrically isolated from the second conductor and electrically connected to the first ground conducting portion; and
a capacitor connected in series between the first signal conducting portion and the second signal conducting portion with respect to a current flowing through the first signal conducting portion and the second signal conducting portion;
wherein the impedance adjusting unit comprises:
a plurality of fourth conductors electrically connected to the first conductor;
a plurality of fifth conductors electrically connected to the second conductor;
a plurality of sixth conductors electrically connected to the third conductor;
a first plurality of the plurality of switches configured to electrically connect some of the plurality of fourth conductors to the plurality of fifth conductors; and
a second plurality of the plurality of switches configured to electrically connect remaining ones of the plurality of fourth conductors to the plurality of sixth conductors; and
wherein the plurality of fourth conductors comprises the first impedance-matching bars, and the plurality of fifth conductors; and the plurality of sixth conductors comprise the second impedance-matching bars.

8. The wireless power transmitter of claim 1, wherein the source resonator comprises:
a first transmission line comprising:
a first signal conducting portion;
a second signal conducting portion; and
a first ground conducting portion corresponding to the first signal conducting portion and the second signal conducting portion;
a first conductor electrically connecting the first signal conducting portion to the first ground conducting portion;
a second conductor electrically isolated from the first ground conducting portion and electrically connected to the second signal conducting portion; and
a capacitor connected in series between the first signal conducting portion and the second signal conducting portion with respect to a current flowing through the first signal conducting portion and the second signal conducting portion;
wherein the impedance adjusting unit comprises:
a plurality of third conductors each having a shape of a linear bar;
a fourth conductor electrically connected to the plurality of third conductors;
a first plurality of the plurality of switches configured to electrically connect the plurality of third conductors to the first conductor; and
a second plurality of the plurality of switches configured to electrically connect the plurality of third conductors to the second conductor; and
wherein the plurality of third conductors comprises the first and second impedance-matching bars.

9. The wireless power transmitter of claim 1, wherein the impedance adjusting unit is further configured to adjust the impedance of the source resonator by selecting a size of a driving coil located in the source resonator using the plurality of switches.

10. The wireless power transmitter of claim 9, wherein the impedance adjusting unit comprises:
   a plurality of first conductors each having a semicircular shape;
   a plurality of second conductors each having a semicircular shape;
   a third conductor electrically connecting together a first end of each of the plurality of first conductors and a first end of each of the plurality of second conductors; and
   the plurality of switches configured to electrically connect a second end of each of the plurality of first conductors to a second end of a respective one of the plurality of second conductors; and
   wherein the plurality of first conductors comprises the first impedance-matching bars and the plurality of second conductors comprises the second impedance-matching bars.

11. The wireless power transmitter of claim 9, wherein the impedance adjusting unit is further configured to select the size of the driving coil using the plurality of switches to connect together at least two of the plurality of impedance-matching bars to form a driving coil having a desired size.

12. A wireless power relay apparatus comprising:
   a relay resonator configured to perform either one or both of wireless power reception from at least one source resonator and wireless power transmission to at least one target resonator;
   a controller configured to determine a number of a plurality of switches to be turned on or off based on either one or both of a power transmission efficiency and a reflection coefficient; and
   an impedance adjusting unit, comprising first and second impedance-matching bars, configured to adjust an impedance of the relay resonator using the determined number of the plurality of the switches and the first and the second impedance-matching bars,
   wherein:
   each of the first impedance-matching bars is located symmetrically to a respective one of the second impedance-matching bars with respect to a respective one of the switches,
   each of the first impedance-matching bars and the respective one of the second impedance-matching bars correspond to the respective one of the switches, and
   each of the first impedance-matching bars and the respective one of the second impedance-matching bars are electrically connected in response to the respective one of the switches being turned on.

13. The wireless power relay apparatus of claim 12, wherein the impedance adjusting unit comprises at least one switch, of the plurality of switches, configured to electrically connect together at least two impedance-matching bars among the plurality of impedance-matching bars.

14. The wireless power relay apparatus of claim 12, wherein
   the relay resonator comprises:
   a first transmission line comprising:
   a first signal conducting portion;
   a second signal conducting portion; and
   a first ground conducting portion corresponding to the first signal conducting portion and the second signal conducting portion;
   a first conductor electrically connecting the first signal conducting portion to the first ground conducting portion;
   a second conductor electrically connecting the second signal conducting portion to the first ground conducting portion; and
   a capacitor connected in series between the first signal conducting portion and the second signal conducting portion with respect to a current flowing through the first signal conducting portion and the second signal conducting portion;
   wherein the impedance adjusting unit comprises:
   a third conductor electrically connected to the first ground conducting portion;
   a plurality of fourth conductors electrically connected to the third conductor;
   a plurality of fifth conductors electrically connectable to or disconnectable from the plurality of fourth conductors via the plurality of switches; and
   a sixth conductor electrically connected to the plurality of fifth conductors; and
   wherein the plurality of fourth conductors comprises the first impedance-matching bars and the plurality of fifth conductors comprises the second impedance-matching bars.

15. The wireless power relay apparatus of claim 12, wherein the relay resonator is further configured to receive wireless power from a plurality of source resonators, and transmit the received wireless power to a plurality of target resonators.

16. A wireless power receiver comprising:
   a target resonator configured to wirelessly receive power via magnetic coupling with a source resonator;
   a controller configured to determine a number of a plurality of switches to be turned on or off based on either one or both of a power transmission efficiency and a reflection coefficient; and
   an impedance adjusting unit, comprising first and second impedance-matching bars, configured to adjust an impedance of the target resonator using the determined number of the plurality of switches and the first and second impedance-matching bars,
   wherein, for each of the first impedance matching bars in the target resonator,
   the first impedance-matching bar is located symmetrically to a respective one of the second impedance-matching bars with respect to a respective one of the switches,
   the first impedance-matching bar and the respective one of the second impedance-matching bars correspond to the respective one of the switches, and
   the first impedance-matching bar and the respective one of the second impedance-matching bars are electrically connected in response to the respective one of the switches being turned on.

17. The wireless power receiver of claim 16, wherein the impedance adjusting unit comprises at least one switch, of the plurality of switches, configured to electrically connect together at least two impedance-matching bars among the plurality of impedance-matching bars.

18. The wireless power receiver of claim 16, wherein the target resonator comprises:
   a first transmission line comprising:
   a first signal conducting portion;
   a second signal conducting portion; and
   a first ground conducting portion corresponding to the first signal conducting portion and the second signal conducting portion;

a first conductor electrically connecting the first signal conducting portion to the first ground conducting portion;
a second conductor electrically connecting the second signal conducting portion to the first ground conducting portion; and
a capacitor connected in series between the first signal conducting portion and the second signal conducting portion with respect to a current flowing through the first signal conducting portion and the second signal conducting portion;
wherein the impedance adjusting unit comprises:
a third conductor electrically connected to the first ground conducting portion;
a plurality of fourth conductors electrically connected to the third conductor;
a plurality of fifth conductors electrically connectable to or disconnectable from the plurality of fourth conductors via the plurality of switches; and
a sixth conductor electrically connected to the plurality of fifth conductors; and
wherein the plurality of fourth conductors comprises the first impedance-matching bars and the plurality of fifth conductors comprises the second impedance-matching bars.

19. The wireless power receiver of claim 16, wherein the target resonator comprises:
a first transmission line comprising:
a first signal conducting portion;
a second signal conducting portion; and
a first ground conducting portion corresponding to the first signal conducting portion and the second signal conducting portion;
a first conductor electrically connecting the first signal conducting portion to the first ground conducting portion;
a second conductor electrically isolated from the first ground conducting portion and electrically connected to the second signal conducting portion; and
a capacitor connected in series between the first signal conducting portion and the second signal conducting portion with respect to a current flowing through the first signal conducting portion and the second signal conducting portion;
wherein the impedance adjusting unit comprises:
a plurality of third conductors electrically connected to the first conductor;
a plurality of fourth conductors electrically connected to the second conductor; and
the plurality of switches configured to electrically connect the plurality of third conductors to the plurality of fourth conductors; and
wherein the plurality of third conductors comprises the first impedance-matching bars and the plurality of fourth conductors comprises the second impedance-matching bars.

* * * * *